US006253064B1

(12) United States Patent
Monroe

(10) Patent No.: US 6,253,064 B1
(45) Date of Patent: Jun. 26, 2001

(54) TERMINAL BASED TRAFFIC MANAGEMENT AND SECURITY SURVEILLANCE SYSTEM FOR AIRCRAFT AND OTHER COMMERCIAL VEHICLES

(76) Inventor: David A. Monroe, 740 Lincoln Center, 7800 IH 10 West, San Antonio, TX (US) 78230

( * ) Notice: Subject to any disclaimer, the term of this patent is extended or adjusted under 35 U.S.C. 154(b) by 0 days.

(21) Appl. No.: 09/257,802

(22) Filed: Feb. 25, 1999

(51) Int. Cl.[7] .................................................... H04B 7/00

(52) U.S. Cl. ............................ 455/66; 455/430; 455/431

(58) Field of Search ............................ 455/66, 414, 430, 455/431, 456, 457

(56) References Cited

U.S. PATENT DOCUMENTS 5,159,344 * 10/1992 Robinson et al. .................... 342/44
5,798,458 * 8/1998 Monroe ................................ 73/587
6,009,356 * 12/1999 Monroe ................................ 701/14
6,112,085 * 8/2000 Garner et al. ...................... 455/430
6,185,430 * 2/2001 Yee et al. ........................... 455/431

* cited by examiner

*Primary Examiner*—Daniel Hunter
*Assistant Examiner*—Thuan T. Nguyen
(74) *Attorney, Agent, or Firm*—Bracewell & Patterson LLP

(57) ABSTRACT

A traffic management, security and surveillance system for commercial vehicles while in port incorporates a plurality of strategically located sensors for identifying the location of both commercial vehicles and support assets, as well as personnel, for monitoring traffic flow and supporting traffic management of the commercial vehicles, assets and personnel while in the area. The location signals are transmitted to a ground based monitoring and control center and may be archived for later playback. The system also is adapted for utilizing on board location signal generators such as GPS sensors to provide traffic flow information and traffic management of all commercial vehicles, assets and personnel on the system.

29 Claims, 16 Drawing Sheets

TERMINAL BASED TRAFFIC MANAGEMENT AND SECURITY SURVEILLANCE SYSTEM FOR AIRCRAFT AND OTHER COMMERCIAL VEHICLES

CROSS REFERENCE TO RELATED APPLICATIONS

This application is a related to my copending applications entitled: Wireless Transducer Data Capture and Retrieval System for Aircraft, Ser. No. 08/745,536, filed on Nov. 12,1996; Video and Data Capture Retrieval Surveillance System for Aircraft, U.S. Ser. No. 08/729,139, filed on Oct. 11, 1996; and Acoustic Catastrophic Event Detection and Data Capture and Retrieval System for Aircraft, U.S. Ser. No. 08/738,487, filed on Oct. 28, 1996 now U.S. Pat. No. 5,798,458, and my copending applications Ground Based Security Surveillance System for Aircraft and Other Commerical Vehicles; Apparatus for and Method of Collecting and Distributing Event Data to Strategic Security Personnel and Response Vehicles; Ground Link with On-Board Security Surveillance System for Aircraft and Other Commercial Vehicles; and, Network Communication Techniques for Security Surveillance and Safety System, filed on even date herewith.

BACKGROUND OF INVENTION

1. Field of Invention

The subject invention is generally related to safety and surveillance equipment for aircraft, ships and other commercial vehicles and is specifically directed to a comprehensive multi-media traffic management and security surveillance system for same while in port or terminal and/or unattended whether taxiing or parked. The system of the subject invention also permits tracking while en route.

2. Discussion of the Prior Art

Security is of ever increasing importance. This is particularly true with respect to commercial airlines as more and more people and freight are moved in this manner and aircraft and other commercial transports increasingly become the targets of terrorists activities. The airways are becoming increasingly crowded with traffic. Global tracking systems are now in place to monitor the flight of the aircraft from the moment it lifts off until it safely lands at its destination. Radar and navigational positioning systems are commonplace both on the aircraft and at the ground tracking stations. All of these electronic systems have increased the overall safety record of commercial traffic to new standards as the number of miles flown continues to escalate.

In addition, the on board avionics including electronic monitoring and diagnostic equipment, particularly on large commercial jets, continues to evolve, giving both the on board crew and the ground assets more complete, accurate and up to date information regarding the condition of the aircraft while in flight. Flight recorders long have been incorporated in order to provide a record of each flight and in order to provide critical information to aid in the determination of the causes of an accident or multifinction should one occur.

However, one area which has been neglected with the ever increasing availability of electronic surveillance is the security of the aircraft or other vehicles or vessels, including, but not limited to, over-the-road vehicles, ships and other commercial transports (collectively referred to as commercial transports), particularly when unattended. Typically, when an aircraft is on the ground, or in port, and unattended the only security provided is the security of the location. If the security of the area in which the commercial transport is stored is breached, the commercial transport is an easy target. In most cases, even the access doors are left open and further, for obvious safety reasons, are designed not to be locked from the outside. Many critical areas of the commercial transport are left exposed such as in an aircraft, by way of example, the landing gear, the engine housing and critical wing and tail components.

In addition, most of the ground traffic control relies on pilot visual information and onboard avionics providing an in adequate, at best, traffic management system utilizing already overworked equipment. The limited control and management of terminal traffic including not only the commercial transports, but also ground personnel, security vehicles and fuel trucks and other support vehicles, creates a dangerous and hazardous condition at most highly congested terminals. There are not any monitoring devices to assure that such traffic is in its assigned zones or to alert when a commercial transport is at risk because of breach of a restricted zone by unauthorized personnel or unauthorized vehicles, including overlapping exclusive occupancy zones by more than one commercial transport.

In addition, with terrorism and sabotage an increasing problem there is significant need to develop an integrated system capable of providing good physical/visual and/or audio surveillance as well as monitoring- of the environmental, security and motion conditions of the commercial transport and various components while the commercial transport is on the ground. For example, a good visual surveillance system would give instant evidence of a breach of commercial transport security, could sound an alarm and could immediately secure the area.

Such a system would also permit the recording of visual information to provide a history for later review, providing yet another source of information for increasing the overall security of commercial transportation.

While such a system would be of great benefit to the commercial transport and airline industries in general and to the commercial airlines in particular, there are no integrated systems currently available which adequately meets these needs.

SUMMARY OF THE INVENTION

The subject invention is directed to a comprehensive multi-media safety, tracking and/or surveillance system, which in the preferred form provides both visual and/or audio information as well as critical data such as location, direction, intrusion, fire and/or smoke detection and/or status of environmental conditions and/or transport systems status. In my aforementioned patent and copending applications, incorporated herein by reference, detection and sensor systems are utilized to provide the flight crew and/or a ground tracking station for commercial aircraft critical information during flight and/or to record the information and data generated during flight for later reconstruction of catastrophic events. The subject invention is an expansion of this concept and adds not only ground security and surveillance, but tracking while in port or on the ground as well as while in route, as well as incorporating the onboard systems of the aforementioned patent and applications. It is an important feature of the invention that the transmitting network for provides a comprehensive communications link between stationary and mobile stations on the ground, the craft or vehicle being monitored and strategic sensors both onboard the commercial transport and the sensors on the ground. In the preferred embodiment of the invention, a wireless LAN (local area network), WAN (wide area network) or other wireless transmission scheme is used as the transmission system of choice. A digital wireless voice intercom is provided for security purposes and for communication between the onboard crew and the ground based personnel. In the preferred embodiment video intercom is also provided. Digital wireless telecommunication capability provides for text communications. Digital wireless (such as, by way of example, LAN) based file communication capability permits the transmission of information such as route or flight plans or gate and dock information. As an example, a LAN or WAN has worldwide tracking capability adapted to be used in connection with a global satellite communication system such as IRIDIUM, wherein the entire path and status of the commercial transport may be monitored while airborne over satellite connections. While wireless systems provide the preferred form of communication, many features of the invention may be practiced using other communication links within the scope and spirit of the invention.

One important feature of the invention is the ability to remotely monitor a commercial transport while on the ground, whether or not the commercial transport is attended. This will permit detection of unexpected events, breach of security, change in environmental conditions and other activities both on and in the vicinity of the commercial transport. A GPS system may be included to provide accurate positioning information of the commercial transport, establishing the parked position of the commercial transport at any time, as well as tracking its movements.

Once in port, the system of the subject invention permits complete monitoring of on ground movement, and allows the monitoring of other commercial transport in the area to assure that the various transports do not interfere with one another. This provides collision avoidance, and can be utilized both on the ground and in the air or in route via water or land. Current airborne collision avoidance is accomplished by use of a radar transponder. Aircraft position is located by radar "echo" response and altitude by a "reporting altimeter" reading being returned to the radar system encoded in the transporter return. Use of a satellite based LAN or WAN will provide an "intranet in the sky", providing much more accurate GPS position, altitude, heading, speed and other navigational information to the FAA and other operators and computer tracking and monitoring stations, thus enhancing collision avoidance information.

In its preferred form, a plurality of sensor units, which may include at least one video or image sensor/device and/or at least one audio sensor and/or at least one motion sensor, are placed strategically about the interior and exterior of the commercial transport and at strategic ground based locations. In addition, strategically placed motion detectors, fire sensors, smoke sensors, door or latch sensors and other monitoring equipment are incorporated in the system. A comprehensive system incorporating these various sensing devices provide a broad based, multimedia safety, security and surveillance system for monitoring commercial transports at any time, whether or not attended.

In addition to safety and/or surveillance issues, the comprehensive data collection scheme of the subject invention provides a system permitting enhanced monitoring and/or response to crew generated work orders or re-supply orders, and may even avoid the requirement that the crew order certain supplies. For example, by monitoring the fuel, fresh water, waste water and/or hydraulic levels onboard and transmitting this to a ground station, refueling, water delivery and/or hydraulic fluid check and supply may be initiated by the station crew and prepared for delivery when the commercial transport arrives in port. The performance parameters of the commercial transport may also be monitored and may be utilized for initiating maintenance procedures, for example, even before the commercial transport is in port. Pre-flight or pre-mission checklists may be enhanced or automated by monitoring the critical functions and criteria via the system of the subject invention. The system of the subject invention greatly enhances maintenance procedures and efficiency. Where desired, the system is capable of permitting the commercial transport to carry its detailed maintenance record onboard, permitting full access to such information at remote locations. The maintenance record can be routinely updated or polled from the home based maintenance station using the system's unique uplink capability. The ability to both send and receive information will support remote control of the commercial transport onboard systems such as lighting, strobes, alarm setting/resetting, environmental controls, locking systems, siren or other audible signals, fuel flow, fire detection and the like.

Situational awareness is also provided by the subject invention. All transports in the terminal area are provided with a GPS location sensor such that the home or ground crew will be able to track and identify the location of every transport in the terminal. This provides better flow of the commercial transports in the terminal area, assuring that proper distance is maintained and appropriate pathways are followed.

The system also permits full situational awareness capability where all ground or water transports in the are provided with GPS location information such that the ground crew will know where all assets are at any point in time. This can provide both collision avoidance as described and also check to assure that the transports are in an authorized area. A composite of all transport location information can be used to provide a "live" display of all assets in the area. Logging of this information will provide good archival information in the event a reconstruction of events, such as a security breach or collision, is required.

The comprehensive multi-media system of the subject invention permits the collection and dissemination of virtually all data associated with the commercial transport at any time, both while in port or in service. In the preferred embodiment a combination of sensors systems are used, with sensors being installed within the transport, on its exterior and at ground-based locations for monitoring the transport when is in port. In such areas where ground based systems are not available, the transport-installed systems still provide useful and enhanced information over the prior art. Likewise, in those areas where unequipped transports enter a system equipped port; the ground based system of the subject invention can communicate via standard ground-to-air radio to provide useful information such as perimeter surveillance and the like. For example, even without the use of on-board systems, the identification number (such as the tail number on an aircraft), owner, state or country of origin and other identifying information can be matched with available data to provide immediate and accurate identification of a specific commercial transport. This permits efficient tracking and response capability of the transport in port, on the ground, or anywhere in the world using satellite communications.

In the preferred embodiment, fixed view and steerable video cameras may be incorporated either on the commercial transport or independently of the transport at ground based sites where commercial transport is located in order to monitor movements around the perimeter of the monitored commercial transport. It is also desirable to include focusing and/or timing functions so that selective pan, tilt and/or zoom (x,y,z) positioning can be utilized. The cameras may be activated and/or aimed and/or focused based on the location data provided by a GPS system integral to the monitored commercial transport, may automatically pan an area, or may be manually operated by crew or ground personnel. Automatic tracking of each transport in the terminal by one or more tracking cameras in conjunction with a recording device can provide an archival record of each asset in case of a detrimental event, such as fire, terrorist event, theft, collision and the like.

Several video cameras may be placed such that the lens of each is aimed through a window opening provided in the fuselage or body in order to provide video imaging of the engines, tail section, and/or landing gear and other functional components of an aircraft. Cameras may be placed throughout the interior of the commercial transport on the flight deck, in the cargo hold, in passenger cabin and/or other desired spaces including on the ground outside the commercial transport. The audio sensors/transducers and/or other sensors and detectors are also strategically located throughout the commercial transport and positioned at strategic locations both internal and external of the fuselage. External sensors based on the ground area surrounding the commercial transport may also be added.

In its simplest form, current sensors are already on the commercial transport coupled with strategically based ground sensors and may be used to provide surveillance and/or warning system. Thus, a basic system may be implemented with a minimum of alteration to the commercial transport and a minimum of expense.

Within the commercial transport, the system may be hardwired or may use wireless transmission and receiving systems. The wireless system is particularly useful for adapting the system as a retrofit on existing equipment and also provides assurances against disruption of data transmission during structural catastrophes such as fire or airframe breakup. In the preferred embodiment, the wireless system is fully self-contained with each sensor unit having an independent power supply and where appropriate, a sensor light source. The ground sensors may likewise be hardwired or use wireless transmission and receiving of video and/or alarm telemetry signals. The ground security system may include motion sensitive, weight sensitive, infrared sensitive, audio sensitive, or other typed activation system so that the equipment is not activated until some event is detected, i.e., the system is action triggered. The ground communications link, monitoring and/or recording systems for collecting and/or transmitting the data as disclosed in my copending applications may be adapted for processing the information gathered by the onground security system and, in the preferred embodiment. The wireless system may use radio frequency transmission and may incorporate the wireless communication system already in place as an integral component of the system. Where desired, a wireless local area network (LAN) or other wireless system may also be utilized for intercommunication among the system components. Preferably, the entire capture, retrieval, monitor and archive system is installed utilizing the wireless transmitting/receiving system in order to assure that transmission will not be lost in the event of a power shutdown or a failure causing possible open or shorted circuit conditions which could occur in a hard wired system.

A commercial transport equipped with the ground surveillance system of the subject invention may not always be located at a port or terminal equipped with a ground security system. In the preferred embodiment of the invention, the on-board system is self-contained and can operate on a stand-alone basis at sites where compatible comprehensive electronic ground security is not available. In those sites with a compatible ground surveillance system, the onboard system communicates with the site-based system to provide information to airport ground personnel and security personnel. The system of the present invention also lends well to a deployable surveillance device carried by the transport, which can be deployed at unequipped sites to permit off-craft monitoring while the commercial transport is at the port or terminal. The system can be positioned at a strategic location within the site whenever the commercial transport is unattended to permit monitoring of the commercial transport from a remote location. The deployable device is then retrieved and stowed in the commercial transport when the commercial transport departs from the site.

In the preferred embodiment, the system will transmit any detected information to a monitor system located at a ground control security station, typically located somewhere within the terminal, tower and/or safety sites such as security stations and fire stations. Detection of activity or fire can sound local and/or remote alarms and/or dial emergency numbers. The data may also be recorded on the standard recorders provided onboard the commercial transport and/or on ground based recorders of conventional type, digital type or a computer based logging system. The security station has instant live access to all of the image and/or audio signals as they are captured by the sensors, and where used, the commercial transport recorder will make an historic record of the images for archive purposes. Where random access recording techniques are used, such as, by way of example, digital random access memory storage devices, the information by be readily searched for stored information.

If unauthorized personnel breaches the security area and the audio and/or video equipment is activated, signals will be immediately transmitted to the security station. This will give immediate access to information identifying the activity and the personnel involved. Further, in the preferred embodiment of the invention, an alarm system will be activated for securing the immediate area and taking counter measures to tighten security such as remote operation of lights and doors, and respond to a breach of same.

In the one embodiment. information from the plurality of sensors on the transport is synchronized through an on board capture/multiplexing system whereby the plurality of data, including visual image data, may be displayed, recorded, and/or transmitted in either a split screen or serial fashion. A "time-stamp" or chronology signal may also be incorporated in the data scheme. Any signal which is capable of being captured and stored may be monitored in this manner. Utilizing the wireless system of the invention in combination with the battery back-up power supply, it is possible to continue collecting information without using ground power or commercial transport power. This assures that the system will operate even if power is disrupted for any reason such as, by way of example, tampering by unauthorized personnel or by fire. In its simplest form, only triggered (activated) sensors are active, i.e., an activity at the site causes a triggering effect and activates the sensor, and only the signals generated thereby are transmitted to the security station. In such a system, multiplexing of continuous signals is not nearly as critical. The "time-stamp" is particularly useful as an aid in reconstructing the events in a "postevent" investigation.

In the one embodiment, the system includes a plurality of strategically located video image sensors and/or audio sensors, each sensor adapted for transmitting the signals to a multiplexer for distributing the signals to monitors and/or archival recorders. The data multiplexer combines all of the signals from the various detector circuits to provide a data stream suitable for transmission over the wireless system.

The LAN transceiver is the interface into the LAN. The LAN transceiver can accept software downloads from various system elements to enable the multi-media sensor system to be maintained or upgraded to perform other functions. Other sensors may also be incorporated in the system, such as motion sensors, smoke and/or fire sensors and the like. The system is configured for selectively transmitting all of the data on a "real-time" or "near real-time" basis, i.e., the data is delivered with only delays for processing time such as compression/decompression, multiplexing and the like. The system is also adapted to provide the monitors access to serial, synchronized full screen view of each of the cameras, in sequential viewing, or alternatively to provide split screen or multi-monitor viewing of a plurality of cameras. The system may be hardwired or wireless transmission may be utilized to further minimize the possibility of a malfunction at the onset of a catastrophic occurrence and to make the system more tamper resistant.

The comprehensive surveillance/communication of the subject invention supports communication of monitored data and/or commands or operational data between the ground or base station and the transport. between the transport and ground or terminal support vehicles and/or equipment, between the transport and various monitoring stations or systems, between transports, between the ground station and the support vehicles, between the monitoring station and support vehicles and between the monitoring stations or systems and the support vehicles. This permits the ground station to monitor and/or determine the identity, location, and heading of any vehicle in its range for tracking and collision avoidance, as well as monitoring sensor information, alarm conditions, emergency conditions, servicing requests, maintenance information, navigational information, requests for information such as flight plans, weather information, route maps, message traffic such as e-mail and the like. Similar information may be transmitted and received between transports, between transports and support vehicles and any of these and the ground station. The ground station may also send operational commands to the various monitoring systems both on-board the transport and ground mounted, such as camera tilt, pan and zoom and sensor activation. Other command signals such as "lock-on" a specific condition or transport, sensor download, activation such as "lights-on" or alarm (e.g., siren) activation and the like.

In a typical application. when an alarm from a specific transport is sent to the ground station it will be tagged with the GPS coordinates of the transport. The alarm will also be reported to a security system, typically including a computerized center that distributes the information of the wireless LAN and. where used, the wired LAN. The mobile and/or personal security units will also report their GPS coordinates to the central computer so that the system knows the location of all security personnel at ant point in time. Once the alarm signal is received, the system can search and identify the closest appropriate personnel and alert them of the alarm condition. This is accomplished by calculating the length of the vectors between the transport GPS and the various personnel GPS signals. The shortest vectors are the nearest personnel and these can be alerted to respond to the alarm condition.

The selected personnel are then signaled by the security system of the present invention to respond. Audio, text and graphic communications may be utilized to inform the selected personnel of the condition and location. The system can also use its "mapping" function to assist the personnel in determining the best route to take in response. Because of the em comprehensive nature of the system of the subject invention, both audio and image conditions of the transport can be communicated directly to the selected personnel, using video conferencing compression techniques of the LAN. If the desired, the personnel can switch cameras to obtain different views, or gain control of the steerable camera disclosed herein and survey the scene as appropriate via remote control. The two-way communication capability of the system would also permit the personnel to communicate conditions and the need for additional personnel or equipment both to the system computer and directly to other personnel. The security computer system will register the GPS location of the selected personnel as well as the location of additional or "back-up" personnel in order to coordinate their movements and actions. The system can then provide essential audio, video and communications to the selected back-up personnel in order to coordinate the entire operation. The coordinates of fixed sensors may also be entered into the system so that personnel can determine the proximity of each available sensor to his GPS location.

It should be noted that the request for back-up can be programmed to be automatically activated under certain conditions. For example, if a security personnel personal system detects an explosion or a gunshot, an automatic alarm condition can be activated to alert central security other personnel in the vicinity to indicated "potential bomb blast" or "potential automatic weapon", all based on the audio signal which is picked up by the sensors by comparing them to known acoustic signatures of these types of events. Shock and vibration detectors may also be included both on board, at fixed locations on the ground and in the portable or mobile units. For example, if a personal unit is dropped, an alarm would be generated. Smoke and heat detectors may also be incorporated to monitor the safety of the environment of personnel.

It is a primary object of the subject invention to provide the means and apparatus for a comprehensive, multi-media traffic management, surveillance and monitoring system for monitoring and tracking a commercial transport vehicle while in port or while in route.

It is a further object and feature of this invention to provide a comprehensive surveillance and monitoring system supported by a wireless transmission system whereby communication of all data including live video and/or audio transmissions can transmitted between the transport, ground or base stations, remote sensor systems, remote or mobile monitoring systems and other transports.

It is another object and feature of this invention to provide tracking capability to assure that a transport stays in an assigned zone while either in route or in the port or terminal.

It is a further object and feature of this invention to provide communication capability for monitoring and/or responding to supply needs on board the transport in order to permit support personnel to expedite response and/or re-supply when the transport arrives in port.

It is also an object and feature of this invention to provide for monitoring of situational conditions of and surrounding the transport both while in port and while in route.

It is yet another object and feature of this invention to provide means for archiving performance parameters for later recall in order to review performance and/or reconstruct events.

It is an additional object and feature of this invention to provide a ground surveillance and security system for detecting the breach of commercial transport security while the commercial transport is on the around or in a port or terminal and is unattended.

It is another object and feature of the subject invention to identify that a commercial transport is on the ground and needs to be monitored for tracking its exact location, and its orientation on the ramp.

It is also an object and feature of the subject invention to provide a security system, which is integral with the commercial transport for providing ground security.

It is a further object and feature of the subject invention to provide communications between the commercial transport and a ground security station to assure commercial transport security while the commercial transport is parked or unattended.

It is another object and feature of the subject invention to provide a comprehensive, multi-media data generating, collecting, displaying, transmitting, receiving and/or storage safety and/or surveillance scheme for commercial transport.

It is also an object and feature of the subject invention to provide an on ground security system which incorporates the in-flight surveillance system in order to minimize the number of additional components required to implement the system.

It is also an object and feature of the subject invention to store video, images, audio and/or transducer data on the commercial transport being protected and/or at the ground security station It is yet another object and feature of the subject invention to provide apparatus for permitting ground and/or base personnel to receive video, images, audio information and/or data relating to critical components and areas of a commercial transport and operational data such as dispatch information.

It is still another object and feature of the invention to permit the monitoring, storing and retrieval of any of a variety of video, images, audio signals and/or performance data by the tracking, surveillance and/or imaging equipment on board the commercial transport.

Other objects and features of the subject invention will be readily apparent from the accompanying drawings and detailed description of the preferred embodiments.

DETAILED DESCRIPTION OF THE PREFERRED EMBODIMENTS

Figure 1:
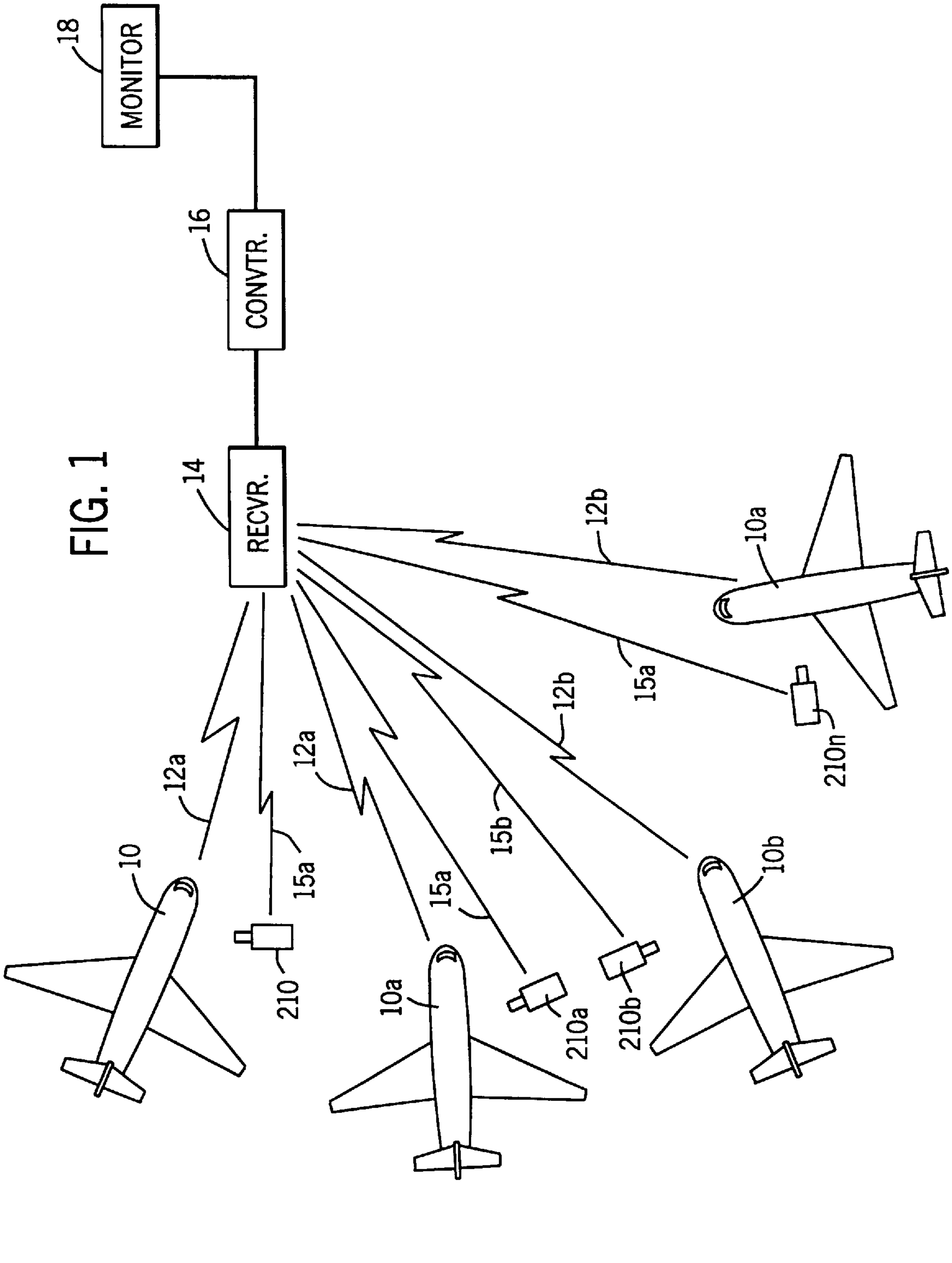
FIG. 1 is a basic diagram of a ground based security and surveillance system incorporating the teachings of the subject invention.

It will be readily understood that the various components and features of the subject invention can be utilized in connection with a tracking, security and/or surveillance system for any of a variety of commercial transports. For purposes of brevity, the features of the invention are described in detail herein as applied to commercial aircraft. This is primarily because it is assumed that aircraft systems are likely to incorporate the most complex and comprehensive surveillance systems of the subject invention due to the importance of securing this commercial transport while on the ground and both the importance and complexity of monitoring and tracking same while in port or in route. The system may be scaled up or scaled down depending upon application. For example, land vehicles such as railroad rolling stock or over the road trucks may need only door sensors, motion sensors and brake monitors, whereas aircraft, as described, will require a substantially more comprehensive system in order to provide adequate surveillance. In the preferred embodiment for aircraft as described in detail herein, the comprehensive surveillance system utilizes the onboard aircraft system in combination with a ground-based wireless system. The wireless configuration can also be applied to the sensors on board the aircraft using the same architecture as described here for the ground based portion of the system. That is, the on board elements may be hardwired, may communicate through wireless radio, or may utilize wireless LAN as herein described, or a combination. The LAN radio provides a wireless LAN connection to other system elements. This is a well-know but evolving technology that allows high bandwidth wireless data transmission between multiple devices. Several different techniques are available from a variety of manufacturers, including Raytheon Systems Corporation, the assignee of the subject invention. Many of these techniques may be utilized in the subject invention.

The comprehensive system includes various condition sensors, motion and audio detectors, video cameras, light detectors, sound detectors, contact switches, temperature detectors and control systems for controlling light, and sound transmissions to the aircraft. A temperature and/or humidity detector may be used for general monitoring functions such as predicting the icing of the wings in winter conditions, or for fire alarm functions. The temperature detector may be any known form for temperature transducer, such as a PTC, NTC, thermistor, or semiconductor element. More advanced semiconductor elements may be used, such as integrated circuit types that may include integral temperature and/or humidity sensors, references, analog/digital convertors, protocol engines and serial driver. Further, integrated circuits can incorporate on-board digital radio elements such as DSP based radios to be completely integrated self-contained chips. The temperature analog/digital convertor adapts the ambient temperature of the environment into a digital data stream. This digitizer runs at suitable rates for continuous temperature monitoring. A signal processor can be used to provide correction to the temperature and/or humidity elements, such as processing out non-linear characteristics of the sensors. It can also be used to look for profiles such as rapidly rising temperature/humidity conditions that may indicate a fire or open door or other security breach. Detection of such an event would trigger a specified unique alarm condition to be transmitted back to other elements of the system.

One of the most significant factors in determining the overall complexity of the system is the cost associated with the various sensor components. For example, in certain applications it may be desirable to add a humidity detector or a carbon monoxide detector. A digital camera may be used, or an analog camera may be used in combination with an analog to digital convertor, or digital with internal digitization circuits, or digital compressed with an internal analog to digital convertor and a motion video compressor. In the preferred embodiment, the camera runs at full-motion rates. However, it will be readily understood that the camera can run at lesser rates for still frame or step video applications. In all cases, accurate information can be supplied on a "real-time" basis, i.e., the information can be transmitted, received and acted upon by man or machine in a timely fashion, sometimes with slight delays, to permit adequate response to an event. The video analog/digital convertor is functional to adapt the analog light modulated signal representing the video scene into a digital data stream. This digitizer can run at "real-time" rates for processing full motion video, or could operate at lesser rates for still frame or step video applications. The signal processor/motion video compressor is flexible and will provide various functions depending upon application. For example, the video processor/compressor subsystem can be programmed to perform functions such as motion detection in several well-known manners and methods. Several techniques are utilized to accomplish motion detection, but the most general method involves capturing repeated video frames and comparing differences in those repeated frames over time. Other techniques such as edge analysis, which looks for specific characteristics in the image, and the changes in such characteristics, may also be used. The processor/compressor subsystem can also be used to image process the video for purposes of contrast enhancement, dynamic range improvement, noise reduction and/or other well-known video processing methods, or other circuitry so configured to perform the processing by well-known techniques. When the video processor/compressor is used for motion detection, any detection will generate a specified unique "alarm condition" to be transmitted to other elements of the system.

FIG. 1 is an illustration of a basic ground based security and surveillance system for aircraft. The aircraft 10, 10*a*, 10*b*. . . 10*n* will be within the view of video sensors or cameras 210, 210 *a* . . . *n* when on the airport ramp. The video processor/compressor can also be used to perform still image compression to reduce the amount of data required to be transmitted over the network. This can be accomplished by using any suitable image compression algorithm, such as the industry standard JPEG algorithm, wavelet compression, DjVu from AT&T, or other techniques. For full motion video surveillance applications, the compressor 406 may be used to provide bandwidth reduction motion video transmissions. In this application, the amount of data representing a full motion video stream would be reduced by using full motion video compression techniques such as Motion JPEG compression, MPEG compression, motion wavelet compression, or other techniques. This allows better bandwidth utilization of the wireless and wired communications channel used by the system.

The aircraft will transmit various identification signals, such as tail number, GPS location and the like, as indicated at 12, 12*a* . . . *n*, to a ground based receiver 14. The camera 210, 210*a* . . . *n* will also transmit video signals to the receiver 14, as indicated at 15, 15*a* . . . *n*. The location of the cameras will be fixed, but may be either permanent locations or "drop and place" movable units dispatched as needed, based on changing security situations. It is also possible that portable cameras will be transported by the aircraft then deployed on the ground, permitting ground surveillance in those airports where a permanent ground security system is not installed. The GPS coordinates of ground based cameras will be stored at the ground or base security station 18, or as preferred in the case of drop and place units, will be sensed by on-board GPS receivers and transmitted to the base station. The received videos from cameras may be converted by optional convertor 16 as required and transmitted to the monitor of the ground based security station 18. The convertor is used to provide compatibility between the transport's format and the ground system format. For example, for analog transmission an aircraft may transmit analog NTSC video in the United States and PAL in England. Digital transmission may be accomplished by placing the convertors at each camera transmitting unit (see FIG. 3) thereby supporting digital data transmission for permitting transmission by the preferred wireless digital system, such as a LAN or W-LAN.

By monitoring the identification information from each aircraft, the transmitted video format from the various cameras can be matched to a specific aircraft. The signal is displayed on a monitor at station 18 where it can be viewed and monitored for surveillance and security purposes. In the event of a breach of security, security personnel may be readily dispatched to the correct aircraft using the GPS location signal to define an accurate position of the aircraft. As will be described, the security signals generated by the system of the subject invention may also be logged and inventoried for later play back, which is particularly useful for reconstruction of events. It will be readily understood that the ground components of the system may be hardwired, or other forms of wireless communication, such as, by way of example, a wireless local area network (LAN) could be utilized using radio frequency or optical communications methods, as will be readily understood by those who are skilled in the art. The system can also be modified to transmit signals from the ground-based station 18 to the various ground sensors and aircraft sensor systems. For example, a camera 210 can receive and respond to remote positioning and zooming signals. Audio warning and activation signals may be sent to the camera locations and to the aircraft to activate audio commands, sirens, lights and the like, which are integral to the system.

Figure 2A:
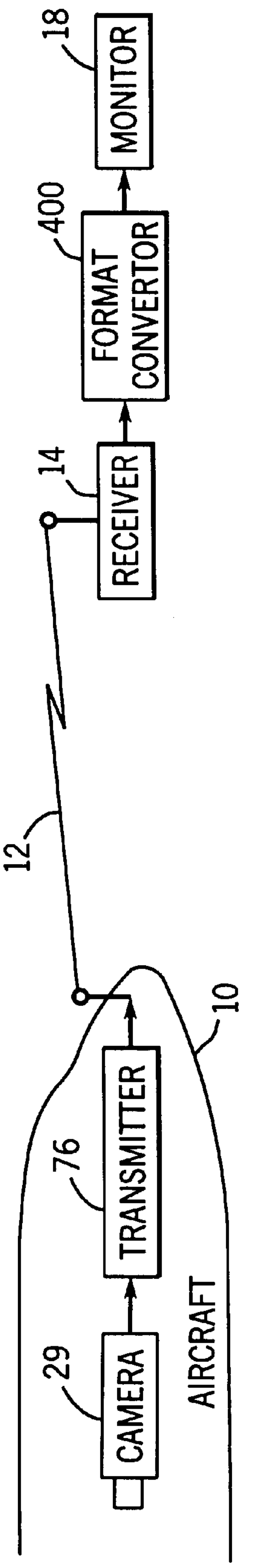
FIGS. 2*a* and 2*b* are diagrams of a simplified, basic camera/transmitter to base station system utilizing a conventional wireless transmission system between transport and the base station, and adapted for converting generally incompatible systems in order to make the system of the subject invention of universal application.
Figure 2B:
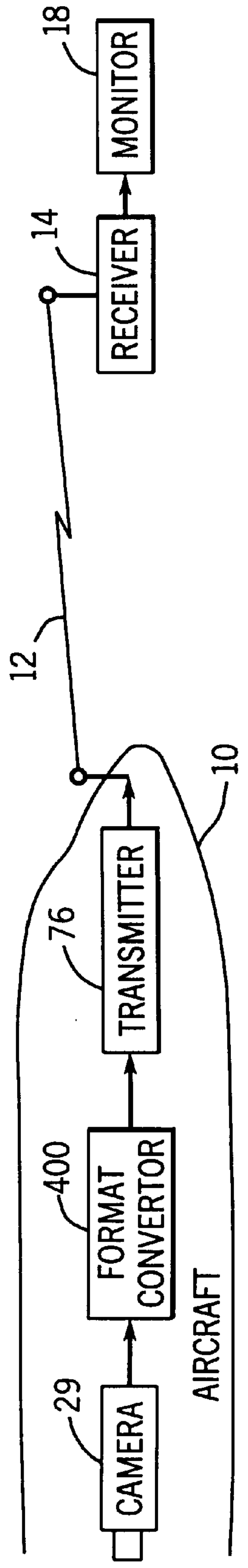

FIGS. 2*a* and 2*b* show two different schemes permitting transmission of monitor system data from a transport 10 to a base station monitor 18 using a wireless transmission scheme as indicated at 12. In FIG. 2*a*, the camera or sensor (for example camera 29) produces a signal which is transmitted as generated by the aircraft transmitter 76 to the base system receiver 14 and then converted at the base system by format convertor 400 for processing or viewing at the base station in its native format. Where desired, the convertor may be at the sensor site as indicated in FIG. 2*b*. Of course, depending on the various systems being utilized, multiple conversion steps may be utilized. Format conversion capability is required in order to make the system global in nature. For example, the format of each aircraft is often dependent on the country of origin. The United States and Japan generally use an NTSC camera format. France and Russia use SECAM. The United Kingdom typically uses PAL. It is important that the ground or base station be able to recognize and convert any of these formats to a suitable format for processing by the base. Compatibility with multiple, yet different, systems can be automatically accomplished. Instant protocol detection and conversion is shown and described in my copending application, Ser. No. 08/816,399, filed on Mar. 14, 1997, entitled: "Instant Protocol Selection Scheme for Electronic Data Transmission via a Distributive Network".

Figure 3A:
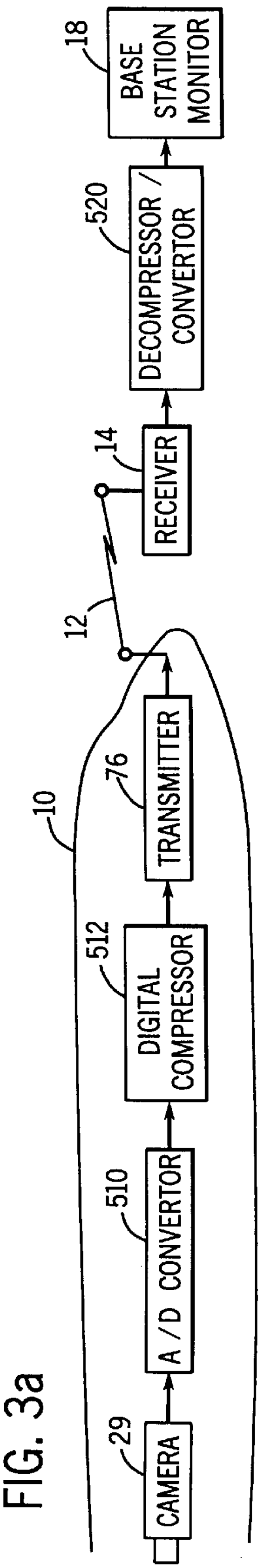
FIGS. 3*a* and 3*b* are diagrams of a simplified, basic camera to base station utilizing a digital wireless transmission system such as, by way of example, a digital radio, wireless digital LAN or other wireless communication system.
Figure 3B:
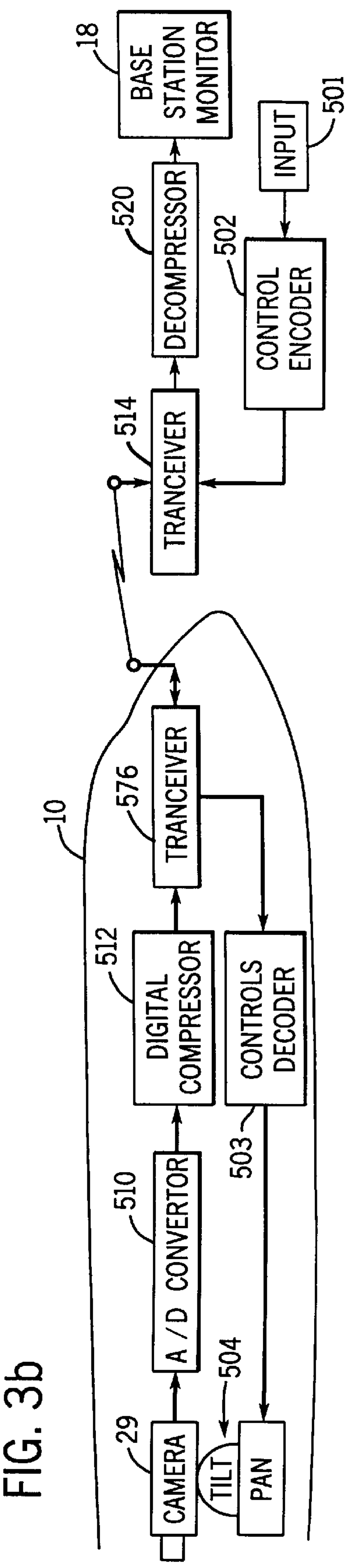

FIGS. 3*a* and 3*b* show a basic wireless digital system. As shown in FIG. 3*a*, the transport 10 includes a sensor such as the analog camera 29 producing an analog video signal which is converted to a digital signal at convertor 510 and compress at digital compressor 512 for transmission via the wireless transmitter 76 via a digital wireless network 12. The Receiver 14 collects the signal, decompresses it at decompressor 520 for input to the base station monitor 18. The system of FIG. 3*b* incorporates two-way communication with the basic digital system of FIG. 3*a*. In this embodiment the transmitter 76 is replaced with a digital transceiver 576 in the transport and the base station receiver 14 is replaced with a digital transceiver 576. This permits command data generated at the input device 501, such as, by way of example, a keyboard or mouse orjoystick, to be encoded at encoder 502 and transmitted to the transport via transceivers 514 and 576. The on-board control decoder 503 then transmits the command or control signal to the device, such as, by way of example, tilt and pan control as indicated at 504 to camera 210.

Figure 4A:
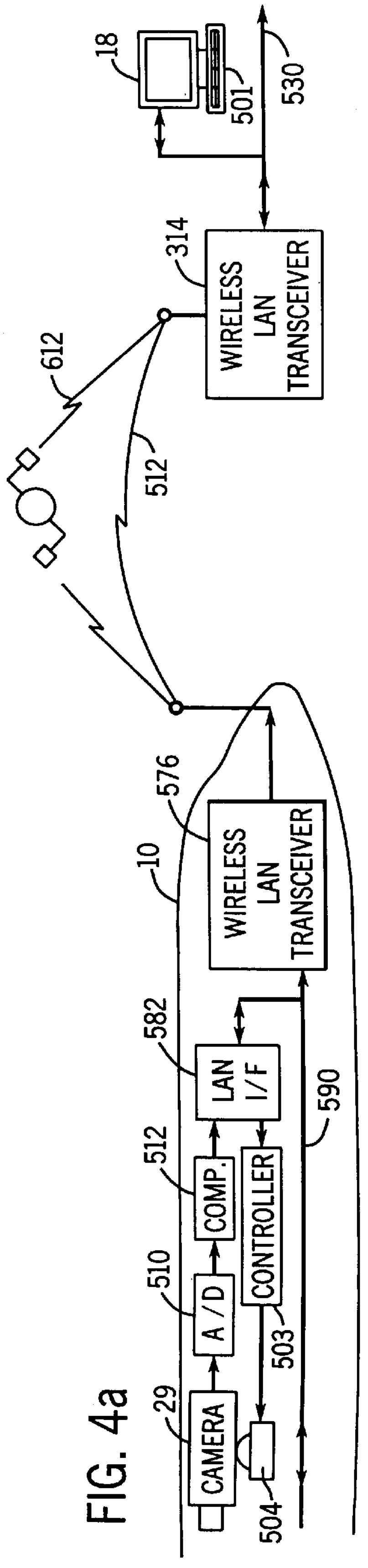
FIGS. 4*a* and 4*b* are diagrams of an expanded system similar to FIG. 3*b*, but showing use of an on-board hardwired system and on-board wireless system, respectively.
Figure 4B:
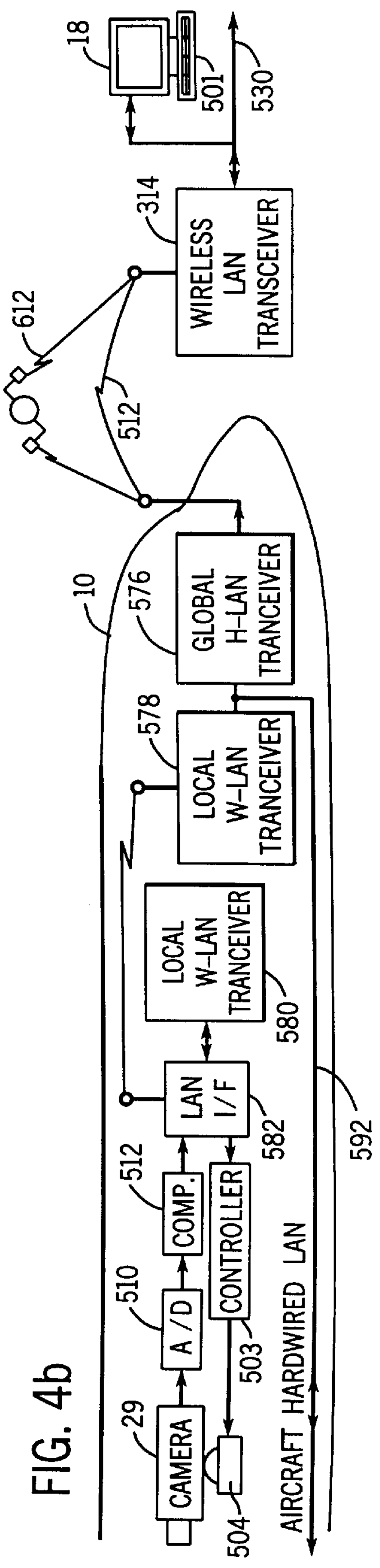

FIGS. 4*a* and 4*b* are expansions of the system shown in FIG. 3*b*, adapted for use in connection with a ground-based wireless LAN 512 or a satellite based wireless LAN 612. In FIG. 4*a*, the on-board wireless LAN transceiver 576 is connected to a hardwired on-board system such as the wired LAN network 590. Preferably, the on-board sensors would be activated by the base unit on an "on-call" or a programmed intermittent basis to conserve power. The various sensor systems such as camera 210 are connected via a LAN interface 582. The base station transceiver 514 is connected to the base station LAN 530, through which the base station workstation 18 and input devices 501 are connected. In the embodiment of FIG. 4*b*, the on-board network is also wireless, such as the on-board LAN 592. In this embodiment, a local wireless LAN transceiver 578 is used to send and receive signals between the various components such as camera 210 via a local (device dedicated) wireless LAN transceiver 580. Of course, it will be understood that the base station LAN 530 can also be wired or wireless as a matter of choice.

Figure 5:
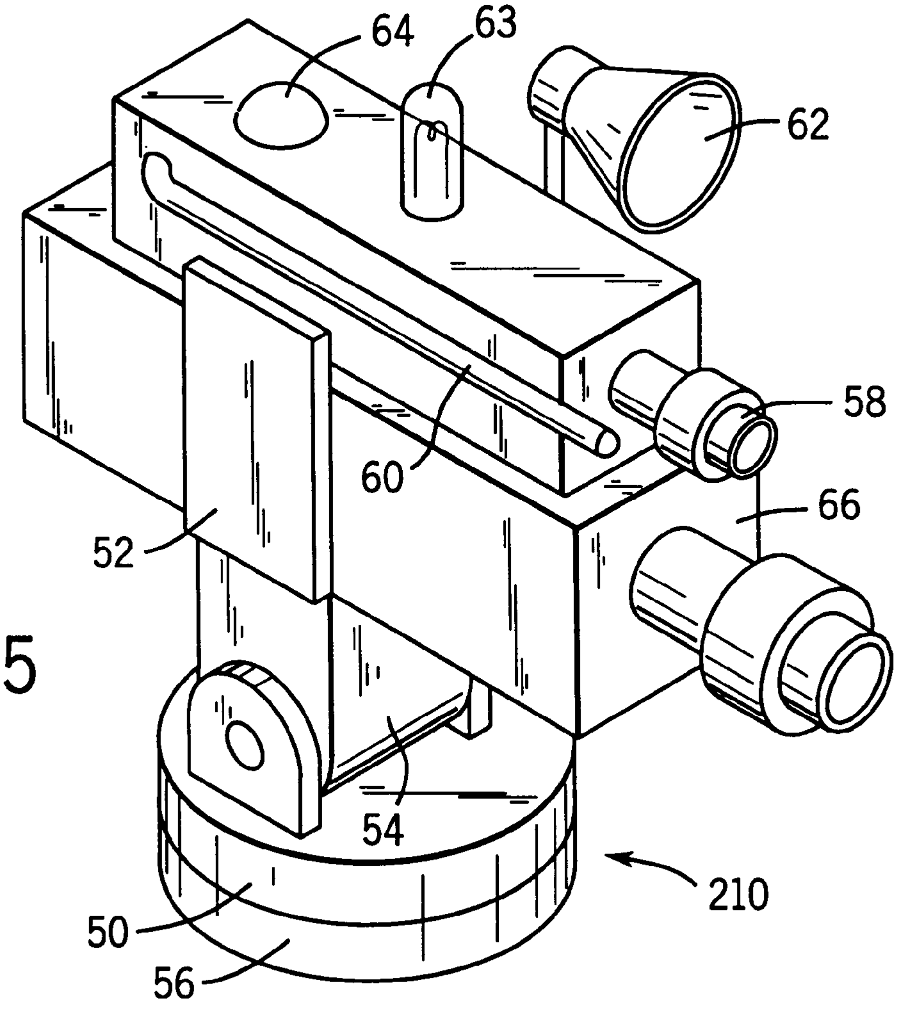
FIG. 5 is a perspective view of a multimedia camera tracking system for use in connection with the subject invention.

FIG. 5 is a perspective view of a preferred embodiment of a ground based tracking camera sensor 210. In the preferred embodiment, the cameras are adapted to respond to several different types of control signals, including but not limited to:

X-axis position control as indicated by X-axis servomotor 50;

Y-axis position control as indicated by Y-axis servomotor 54;

Lens zoom control as indicated by motorized zoom lens 58; and

Iris control as indicated by iris controller. (The iris may also be automated).

As shown in FIG. 5, the camera system includes a base or mounting bracket 56 for mounting the system at location. The system body 52 is mounted on a tilt mount 54 (y-axis) and pan mount 50 (x-axis), permitting panning (x direction) and tilting (y direction) of the camera for scanning a wide area. A motorized zoom lens 58 is provided (z direction). The preferred embodiment of the system also includes an audio sensor such as directional microphone 60. The audio sensor may be an acoustic transducer, such as a microphone, that collects audio information from the surrounding area. The collected audio can be processed to detect potential emergency conditions such as a gunshot or an explosion, or can be routed directly back to the monitoring station. Using the sensors of the subject invention, locational origin of an explosion or a gunshot or the like can be triangulated from multiple sensors and the positional origin can be calculated and displayed on maps as an overlay for assisting in pursuit of a perpetrator. The calculated origin can also be correlated by computer to the nearest appropriate emergency assets, base upon their known positions, and those assets may be automatically dispatched. The audio analog/digital convertor adapts the acoustic signal representing the audio environment into a digital data stream. The digitizer runs at real-time rates for real-time audio monitoring. The audio signal processor/compressor has two functions. It is programmed to perform detection in a number of different manners. For example, the processor algorithms can be adjusted to detect impulse noises such as gunshot or a small explosion. Detection of such an event would trigger a specified unique "alarm" for that condition to be transmitted back to other elements of the system. Other types of detection are also possible. By using frequency analysis transforms and signature profiles, noises from engines, door openings or other distinctive noises could be detected when warranted by the situation or condition. For audio surveillance applications, the compressor can also be used to provide bandwidth reduction for audio transmission. In this application, the amount of data representing a real-time audio stream would be reduced by using audio compression techniques such as LPC-10, or other well-known or proprietary algorithms. This allows better bandwidth utilization of the wireless and wired communications channels used by the system.

Illumination means such as the infrared illuminator 62 permits surveillance during low light no light conditions, without detection by unauthorized personnel. A visual light/strobe light 63 can be turned on by locally detected events, by control signal, or by other system elements such as detection by a companion sensor unit signaling over the LAN. This light can illuminate an area of concern, attract attention of security personnel as a signal, or scare away unauthorized personnel or intruders.

An integrated GPS receiver 64 is provided for generating location information. This is particularly useful for "drop-and-place" sensors as opposed to permanent sensors. Other features such as a laser range finder 66 that can measure distance to objects/personnel may be incorporated to further expand and enhance the capability of each sensor component. The camera system shown has full 360 degree field of view capability which may be controlled manually by remote control signals, may be programmed to pan the area on a time sequence, may track a moving transport using GPS signals from the transport or by using image processing "tracking software" processing the camera image, or may be responsive to and activated by an event occurrence such as from sensors distributed throughout the ramp areas, reporting activity over the LAN, in the well known manner. The range finder 66 permits the tracking system to locate objects in a precise manner and then provide control signals to permit accurate surveillance and monitoring of same, such as zooming the camera or positioning of other sensor elements. An onboard dual GPS systems on the aircraft, with one GPS at the tail and one at the nose, used in conjunction with the GPS system 64 permits the system to determine size, heading and distance to the aircraft being monitored, providing accurate location information and permitting the camera to automatically adjust to monitor the entire aircraft within its range. This permits the selection of the correct camera when multiple cameras are available and permits a wide range of viewing possibilities by being able to determine what portion, if not all, of the aircraft is to be monitored at any given time. In those instances where the aircraft is equipped with a single GPS system, much of this versatility is preserved. However, it will be understood that aircraft size then would have to be determined from the aircraft type or by optical means. When the transport is not equipped with the GPS system, the other sensors such as the range finder/tracking camera or ground level sensors would provide data for cameral selection and updating of electronic situational maps. Each sensor and/or camera may incorporate a motion sensor and/or an audio sensor activation device so that the system may be activated when a sound or a motion occurs within the sensor range. The motion detector may comprise any transducer unit that can detect the presence of an intruder and can be a device such as an infrared motion detector, a thermal sensor, an ultrasonic detector, a microwave detector, or any hybrid of two or more of these detectors "fused" together to gain better sensitivity and/or improved detection accuracy. A motion detector convertor may be incorporated to convert the signal from either a single motion detector sensor or a battery of sensors to digital form for processing and/or transmission to other system elements. Multiple elements may be contained within a single sensor system package, or may be fused for multiple sensors in geographically distributed elements with data to be fused being transmitted over the LAN. The motion detector signal processor is adapted for analyzing the sensor data streams from one or more sensors to provide for better sensitivity or improved detection accuracy. Well-known techniques may be implemented to process the transducer data and detect surges over the set thresholds that represent detection. The processor/compressor can also be configured to accept input from multiple sensors and process the inputs in a "fused" manner. For example, signals form an infrared detector and ultrasonic detector may be "added" together, then threshold detection performed. This ensures that both an optical and an acoustic return are detected before an alarm condition is broadcast. These and other more sophisticated well known techniques can be used together to gain better sensitivity and/or improved detection accuracy. Detection of such an even would trigger a specified, unique alarm condition to be transmitted back to the other elements of the system.

Typically, the sensors will "sense" the presence of unauthorized activity and activate recording from the various audio and/or video equipment and activate alarms. This will initiate the generation of a signal at each of the activated units. The generated signals will then be transmitted to the monitoring and recording equipment, as described, to permit both real-time surveillance and recordation of activity at the site. Motion detection may also be determined using video time/change techniques in the well-known manner.

Figure 6:
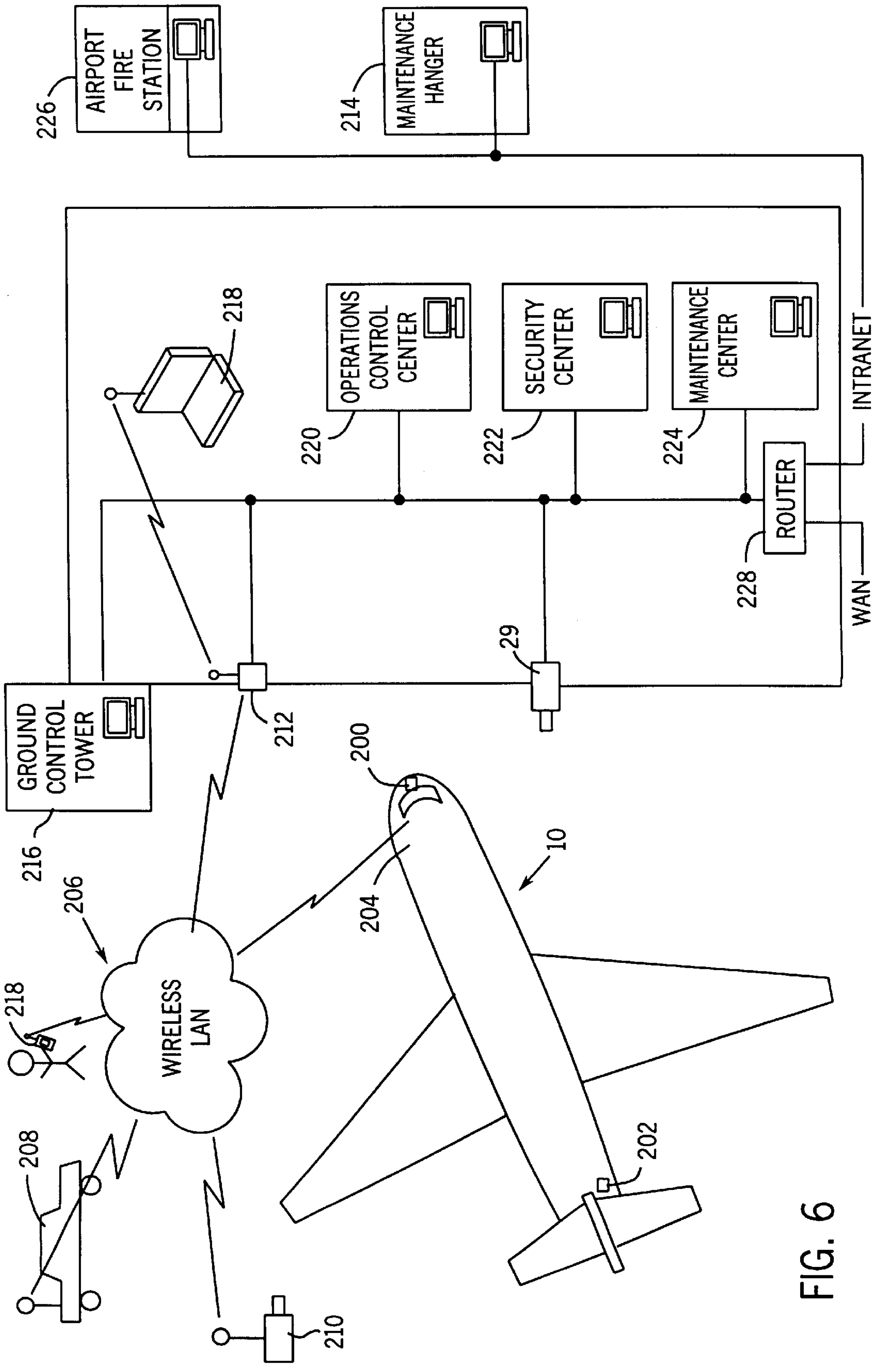
FIG. 6 is an expanded system incorporating the teachings of FIG. 1, including a remote mobile security unit and utilizing a local area network (LAN) as the signal transmitting and receiving system applied to the fixed components of the system, a wireless network such as a wireless LAN (W-LAN) for the signal transmitting and receiving system applied to the mobile components of the system and a wide are network (WAN) as the signal transmitting and receiving system applied to distant components of the system.
Figure 7:
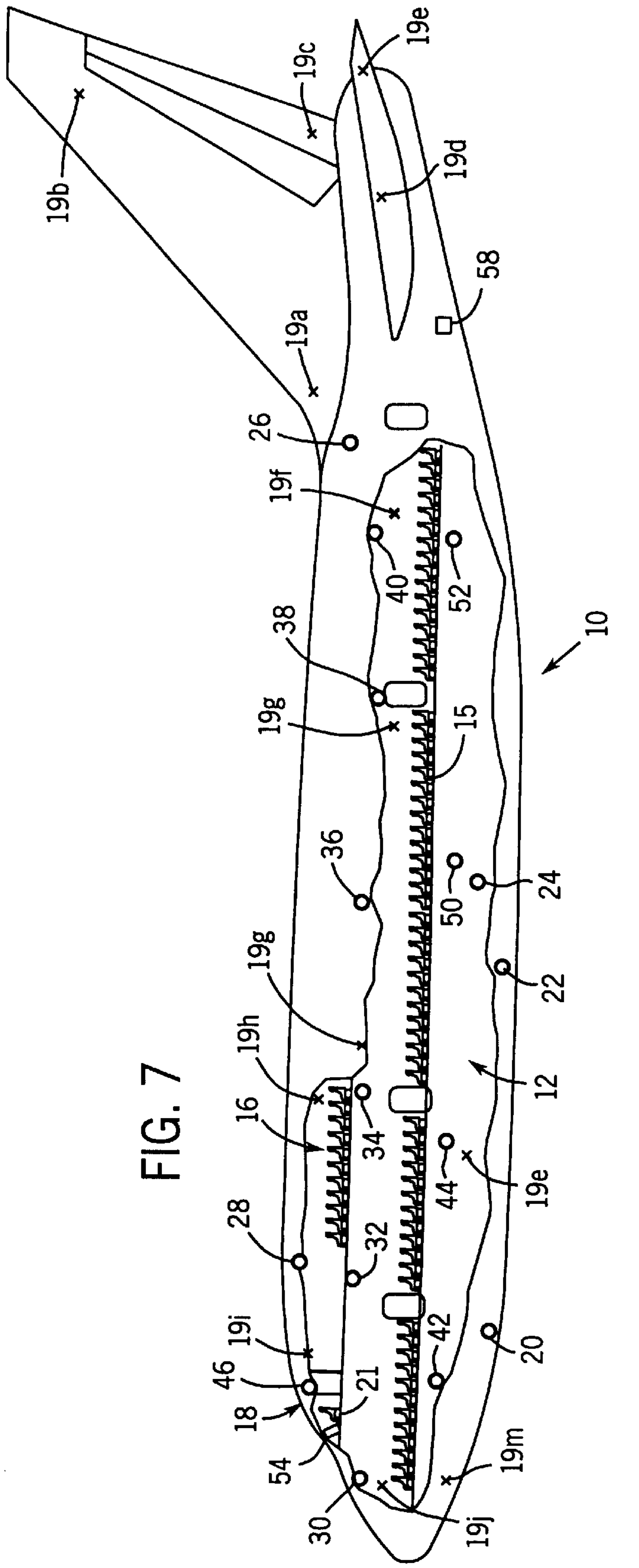
FIG. 7 is an illustration of an aircraft as an exemplary commercial transport and shows the incorporation of on board systems with the comprehensive tracking and monitoring system of the subject invention.

FIG. 6 is an expansion and further refinement of the system of FIG. 1 and is a diagrammatic illustration of the system of the subject invention as configured for a wireless local area network (LAN). In the preferred embodiment the aircraft 10 will include a comprehensive in-flight security system, as better shown in FIG. 7, which is cutaway diagram of atypical commercial airline fuselage 10, with the cargo hold 12, the passenger cabins 15, 16 and the flight deck or cockpit 21 partially visible and a plurality of sensors 19*a–n*. A more detailed description of this onboard system is shown and described in my aforementioned U.S. Pat. No. 5,798,458 and copending applications Ser. Nos.: 08/729,139, and 08/745,536. In the subject invention, the currently available sensors may be utilized, without additional enhancements or a number of additional sensors may be added. For example, ground surveillance could be accomplished using only the on-board sensors on the aircraft. In the example, a number of video image sensor devices such as, by way of example, analog video cameras, may be mounted inside the skin of the aircraft and aimed through openings or windows provided in the fuselage to focus on critical components of the aircraft, such as the landing gear cameras 20, 22, the wing engine camera 24 and the tail camera 26. Similar devices or cameras may also be strategically placed throughout the interior of the aircraft, such as the passenger cabin cameras 28, 30, 32, 34, 36, 38, 40, the cargo bay cameras 42, 44, 50 and 52, and the flight deck camera 46. The sensors 19*a–n* may include smoke and fire detectors, motion detectors and audio sensors strategically placed throughout the aircraft, both internal and external of the fuselage. The placement and number of devices is a matter of choice depending upon the configuration of the aircraft and the level of surveillance desired. In the preferred embodiment the on-board aircraft sensor system is used in combination with the ground based system to provide a comprehensive surveillance and security system of the aircraft while on the ground.

With specific reference to FIG. 6, in the preferred embodiment the aircraft 10 will also include a nose GPS sensor 200 and a tail GPS sensor 202. The dual GPS sensors permit redundancy, very accurate location and directional positioning of the grounded aircraft, as well as providing information identifying the size of aircraft. An aircraft reference signal (such as tail number) country of origin, owner, and the like, may be incorporated in the transmitted signal so that the monitoring station can identify the aircraft, its location and the security condition thereof by monitoring the signal from that specific aircraft. In the wireless embodiment shown, the aircraft is equipped with a wireless transceiver 204 for transmitting all of the collected signals from the sensors and cameras via the wireless network represented by the wireless communication "cloud" 206. The wireless system shown in FIG. 6 permits transmission not only to the ground control tower and security, but expands the transmission of data to all locations and stations which are part of the wireless system. For example, the signals may be transmitted to a patrolling ground security vehicle 208, a portable monitoring station 218 and/or to the ground security center via the wireless LAN transceiver 212. In addition, signals may be transmitted in either a send or receive mode from any unit in the wireless system to any other unit therein. This is particularly useful when trying to coordinate a response to an incident in a quick response mode.

As shown in FIG. 6, permanent ground units may be hardwired in typical wired LAN system configuration, with a single wireless LAN transceiver 212 serving the permanent ground base portion of the system. Depending on convenience of application, it will be readily understood that any combination of wired or wireless component configurations can be utilized. For example, it the maintenance hangar 214 were a great distance from the ground surveillance center at tower 216 a wireless (RF or optical) LAN communication link may be preferred over a hard-wired system. Use of the wireless LAN will also greatly facilitate the adaptation and retrofitting of airports not having ready cabling capability or infrastructure.

The wireless LAN 206 or other wireless communication system provides a connection between the aircraft 10, the fixed ground resources via transceiver 212, mobile ground resources such as the security vehicle 208, portable ground resources such as the portable ground security station 218 and various functional or operation centers such as the control tower 216, the operations control center 220, the security center 222, the maintenance center 224, the maintenance hangar 214 and the airport fire station 226.

In the preferred embodiment, and as shown in FIG.6, the portable (or drop in place) camera/sensor/link device 210 (see FIG. 5 and accompanying description) is adapted for providing any combination of video surveillance, audio surveillance, motion detection, acoustic detection, sensor positioning capability and wireless link to other system elements. The security vehicle 208 is equipped with a sensor viewing capability as well as an alarm annunciator to alert the operation for quick response. Typically, the transmission of an alarm signal by the aircraft will trigger a link-up at the various monitoring units and will interrupt routinely monitored signals. The alarm signal will include aircraft identification and location data, as well as an indicator of the sensor triggering the initiation of the alarm signal. The alarm location may also be displayed on a "moving map" display, in the well know manner. This permits a quick response team to focus on the incident causing the generation of the alarm signal. In the preferred embodiment of the invention, the alarm at the sensor location is adapted to operate in either an audible or silent mode, depending on the surveillance operation. For example, a warning signal may be broadcast at the location to scare off intruders who breach a restricted area or, in the alternative, the warning signal may only be transmitted and sounded at the base station and/or security vehicles alerting base personnel of a situational change at the monitored zone. Hand held or belt mounted wireless LAN personal security assistants can also be used. These would allow personnel to have access to critical security information while on foot patrol or making rounds, permitting almost immediate response to activating conditions in their vicinity. This would also allow the automatic signaling and dispatch of personnel based upon their identity or based upon their GPS determined location.

The system wireless LAN transceiver 212 operates as the gateway to the ground based, permanent, wired facilities. A router 228 is provided to bridge the various airport facilities (i.e. an intranet). The router is a typical industry type, as is well known to those skilled in the art, and may be installed in many configurations as required. Where desired, the system may be connected to remote nodes as well, through a wide area network (WAN), permitting connection to FAA regional centers, airline corporate operations or aircraft manufacturer operations, for example. The router may be configured as needed with typical commercial techniques, such as firewalls to protect access, protocol convertors, and encryption devices, as needed to direct secure or unsecured information to the various ports, nodes and centers.

Where desired, only preselected alarm signals may be transmitted to selected centers. For example, any heat or smoke detection, fuel spill detection or medical emergency would generate an alarm signal at the fire control center 226. The maintenance hangar may have access to fluid sensor data and stored maintenance requests and records. Thus the system can be configured in an information hierarchy format where only useful information is forwarded to the various centers.

The use of the dual GPS receivers 200, 202 on the aircraft 10 permits the reporting of the general location of the aircraft on the ramp during taxi when parked whether or not attended. The use of two GPS receivers provides redundancy, better accuracy and orientation information for the aircraft by reporting two distinct position datum signals. It will be readily understood by those skilled in the art that other position signal devices could be utilized such as, by way of example, a single GPS receiver and a magnetic compass (which may have to be corrected for local magnetic fields or interference). By linking the position and orientation information to the ground based centers the location and orientation of the aircraft at all times it is on the ground the aircraft may be closely monitored. Such a system provides ground control transmitting signals showing the location and movement of all aircraft while on the ground, in much the same manner the radar transponders provide air controllers with position and movement data while the aircraft is airborne. This is particularly desirable when the movement of aircraft is portrayed on a map display. Other ground vehicles such as fuel trucks, waste water trucks, baggage handling trains, security vehicles and the like can also be tagged with GPS receivers and LAN transceivers for monitoring their position relative to the aircraft on the ramp. An automated computer system can be operating in the background looking for potential collisions and generating alarm messages if such a conditions is detected. Another automated computer function can track vehicles relating to their authorized areas and issue alarms if security is breached. Yet another function can track the presence or absence of needed services, such as the timely appearance of catering trucks, fuel trucks, wastewater trucks, baggage trains and the like after the arrival of a subject transport. If any of these required services do not arrive at the transport within a prescribed time period, and "alarm" can be reported over the LAN to the missing services vehicle, and/or to the responsible operations center. This function can be completely automated by a controlling computer system.

Figure 8:
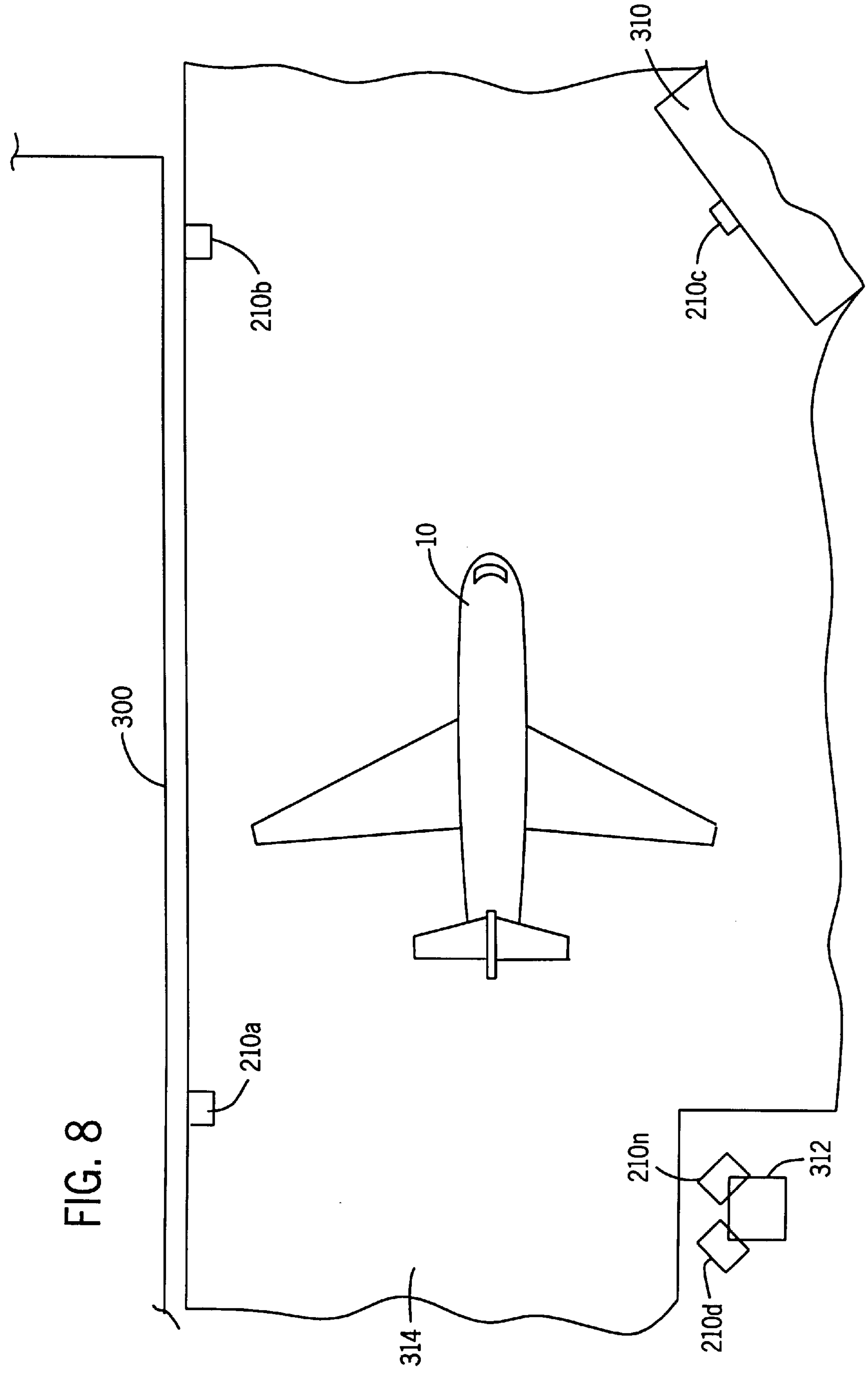
FIG. 8 shows a typical ground based system.

As shown in FIG. 8, in a typical installation, external sensors 210*a–g* placed on the ramp in the vicinity of the aircraft to monitor the exterior of the aircraft. For example, a plurality of video cameras 210*a* and 210*b* may be placed along the exterior fence 300 of an airport. In additions, cameras may be placed in other strategic locations such as the camera 210*c* mounted on the terminal building 310 and the remote cameras 210*d–n* mounted on base units 312 located strategically throughout the airport. When an aircraft 10 is parked on a surveyed area of the airport ramp 314, the various cameras 210*a–n* and or other ground based sensors will provide a secure area for the aircraft. Any activity within the range of the cameras may be viewed and monitored.

The system of the subject invention is designed such that aircraft onboard sensors and ground-based sensors may be used in combination to provide a comprehensive security system. The ground-based sensors may be used alone to provide basic ground security. The aircraft sensors may be used alone to provide some ground based security with a minimum of modification to existing hardware.

In the embodiments shown and described, a multi-media recorder is utilized to record the information for archival purposes. This can be a ground based recorder or the aircraft "black box" recorder 58 (shown as installed in the tail section of the aircraft, see FIG. 7) may be utilized, in the same manner as the current data and voice black boxes (not shown).

Audio and video monitors are also provided at the base security station to provide near real-time surveillance. The flight deck monitor and control panel 54 is located on the control panel in the cockpit 21 will also have access to this information. Other monitors may be provided where desired.

Figure 9:
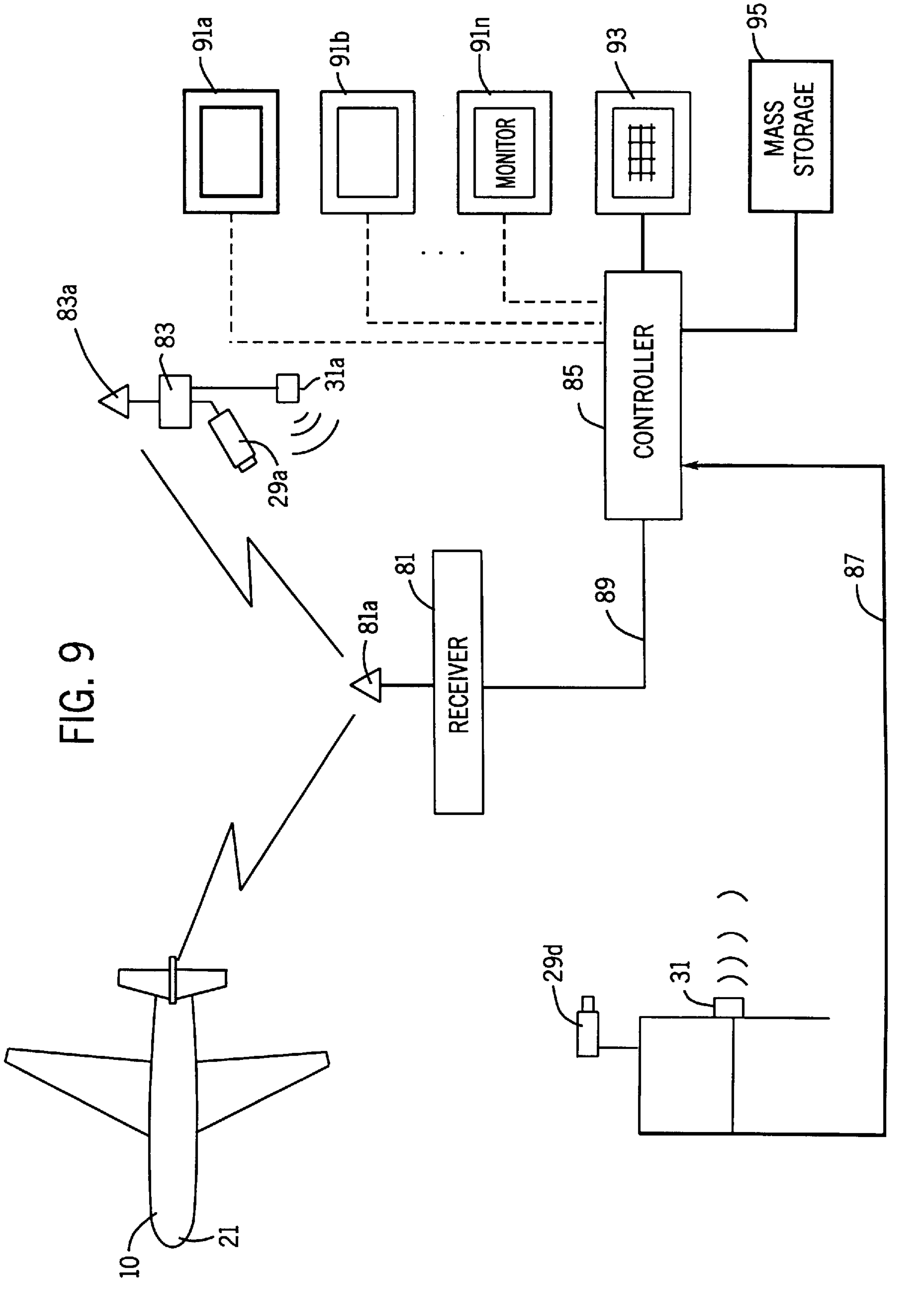
FIGS. 9 is an expansion of the system shown in FIG. 1, utilizing a remote receiver and monitor station in combination with hardwired ground components, wireless ground components and an aircraft system interface.

Turning now to FIG. 9, the system shown is adapted for wireless installation using both onboard aircraft sensors and ground based remote sensors. The system shown relies on the standard on-board radio of aircraft 10 to transfer all aircraft signals to the base station receiver 81 via antenna 81*a*. In the alternative embodiment of FIG. 9, the ground-based cameras (camera 210*d*) and a motion sensor 31 are hardwired as shown at 87 to a controller 85. The on-board signals are input from the receiver via hard wire 89. Wireless ground based sensors such as the camera 210*a* and the motion detector 31*a* may be used in combination with the hardwired ground based cameras (see camera 210*d*) or other hardwired sensors. This permits maximum flexibility of the system architecture. The wireless signals will be transmitted via a dedicated sensor array transmitter/receiver 83 and antenna 83*a*.

The controller 85 will feed the data signal to a split screen monitor 93, where all video signals may be simultaneously monitored and/or to a plurality of distinct monitors 91*a*–91*n*. The split screen technology and methodology is more fully described in my copending application entitled: (Photo Telesis 006), incorporated herein be reference. It will be readily understood that as many monitors and audio output devices as desired may be utilized, permitting surveillance at various locations throughout the port. In the preferred embodiment all of the signals are stored in a recording system as indicated by the mass storage unit 95. This permits replay of the transmitted signals for reconstruction of events and also provides permanent archive records where desired.

Figure 10:
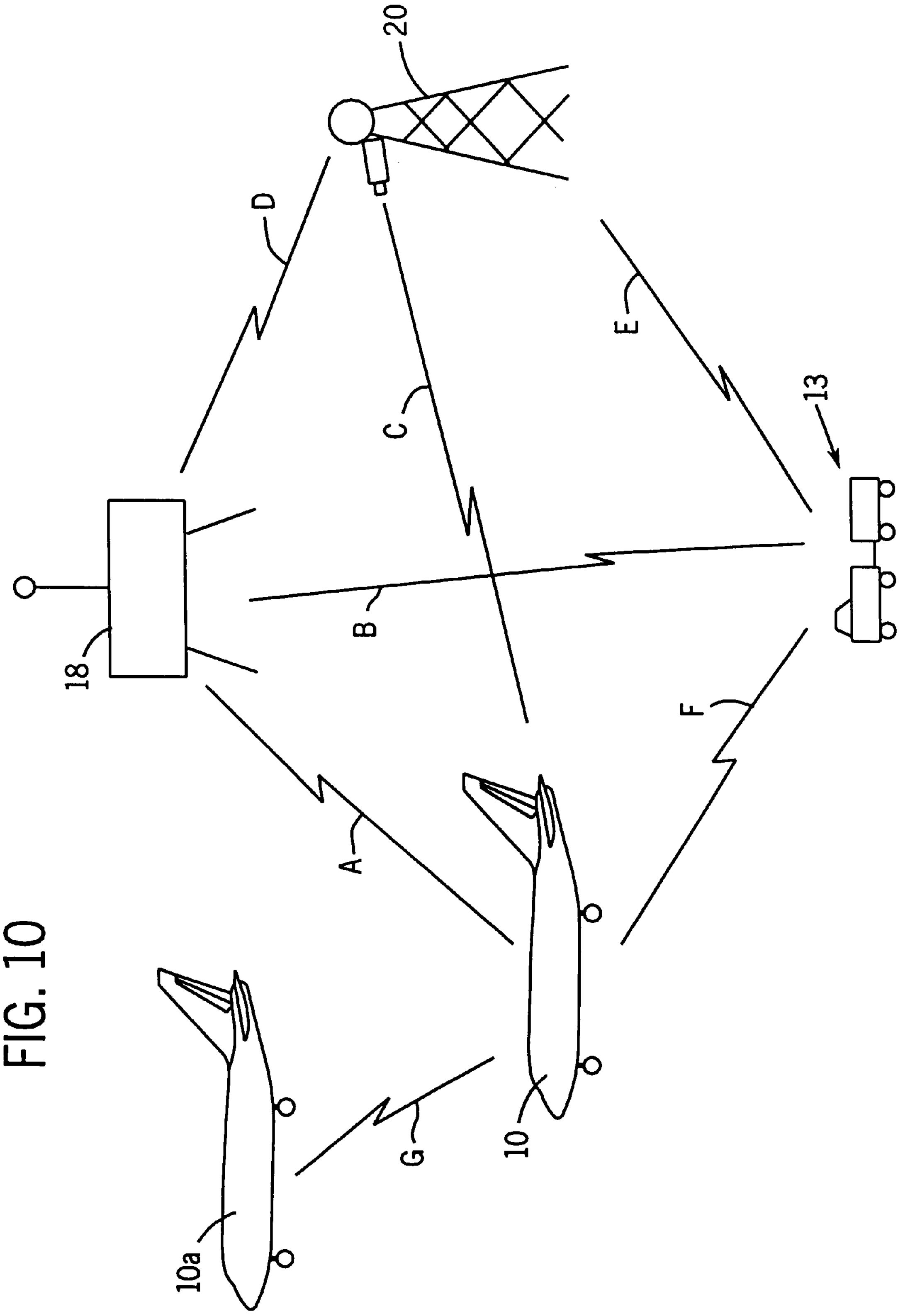
FIG. 10 is a simplified diagrammatic illustration of a wireless LAN or WAN networked system illustrating the versatility of information transmission and monitoring capabilities.

As shown in FIG. 10, the use of a wireless network provides maximum versatility in the transmission of information and the monitoring and processing capability provided by the system. As indicated in FIG. 10, the transport 10 both sends and receives information between the ground station 18, as previously described and as indicated by the wireless data path A. The transport may also transmit and receive between the fixed sensor station(s) 20 as indicated by wireless data path C. The fixed sensor station is also in direct communication with the ground station as indicated by wireless data path D. It should be understood that permanent installations such as the ground station and the fixed sensor station could be hardwired with one another without departing from the scope and spirit of the invention. In addition, support vehicles such as, by way of example, the baggage train 13 may be equipped with sensors such as location sensors and the data generated by this sensor may be transmitted to the ground station via path B, the monitor station via path E and directly to the transport via path F. The ground station 18, monitor station 20 and transport 10 may also communicate directly with the ground support vehicle 13. For example, if the ground support vehicle comes within a designated "keep-out" or no trespassing zone or is too close to the transport, a proximity sensor or calculated from the GPS data may be utilized to activate and send a warning signal to the ground support vehicle. As indicated by wireless path G, sensor data may also be communicated between multiple transports 10 and 10*a*.

Figure 11:
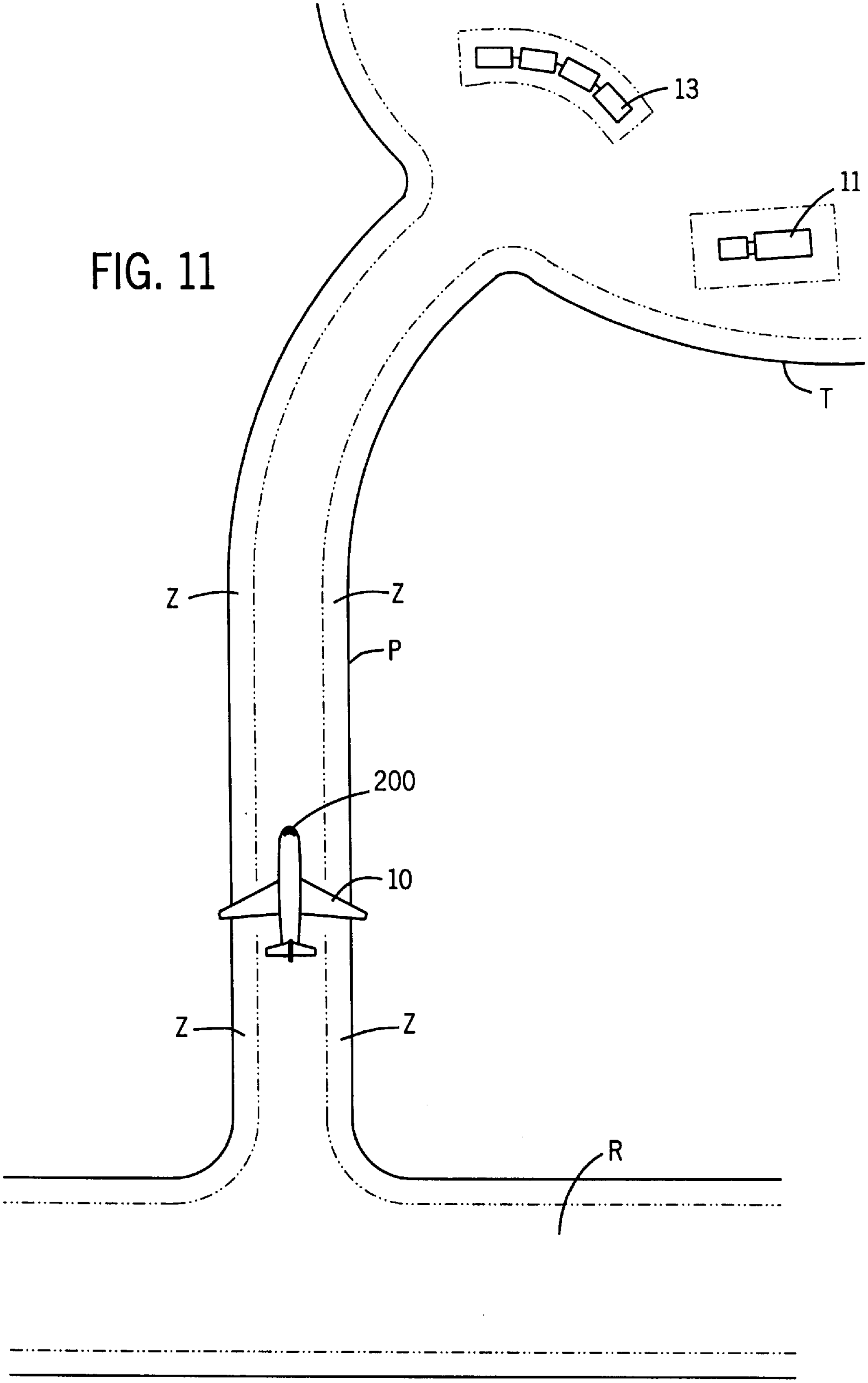
FIG. 11 is a diagrammatic illustration of the system being used in a taxi protection and/or tracking mode.

The comprehensive system of the subject invention not only provides surveillance of the aircraft while at the gate or while unattended, but also provides taxi protection and monitoring. As shown in FIG. 11, when all ground vehicles such as fuel truck 11 and baggage train 13 are outfitted with GPS receivers as well as the aircraft 10, the location and safe distance of each vehicle and the aircraft may be monitored. "Train" type vehicles may be outfitted with two or more GPS receivers to relay the length of the vehicle. Each car can have a separate module. A computerized map of the airport tarmac T, the taxiways P and runway R can be generated showing the position, direction and movement of each vehicle and the aircraft. Predefined keep-out "zones "Z" may be established and an alarm may be sounded if the zones are breached. Also, prescribed areas for authorized vehicles may be established and monitored. If a vehicle is outside the designated area, or breaches a zone "Z", an alarm condition will result. This can be prioritized as a cautionary breach, a dangerous breach and so on, depending on proximity of the various vehicles and aircraft to one another. For example, if an aircraft 10 comes too close to a fuel truck 11, alarms in the aircraft, the fuel truck will be activated. In the situation advances to a danger zone, a second alarm condition may alert ground or base personnel that a breach has occurred so the intervention may be initialized. Logging of the "safety" breaches can be made so that safety improvements or training may be implemented based on need.

A combination of ground sensors in a matrix on the airport ramp (see sensors 210*a*–210*n* in FIG. 8) will scan and monitor vehicles. If a vehicle is detected that does not have a GPS identification authorized for that location and alarm condition will result. For example, if a stray baggage train 13 entered the taxiway area, an alarm would sound indicating that the train 13 has entered an unauthorized area. Emergency and security personnel may also be alerted and dispatched if unauthorized or untagged (no GPS identifier) vehicles are present. This protection scheme could be expanded to include personnel as well as vehicles. For example, the ground vehicle can have a sensor that reads a personnel security token or device such as an encoded digital key. This key information would enable the vehicle and would also be encoded with GPS information and vehicle identification, which is transmitted over the LAN. Security software can then check to determine if the individual is authorized to be present in the vehicle at that time and location, activating an alarm if proper authorization is not confirmed. The vehicle could also be immediately shut down. Visual identification of personnel may also be accomplished using the sensor systems of the subject invention.

Figures 12A, 12B, 12C:
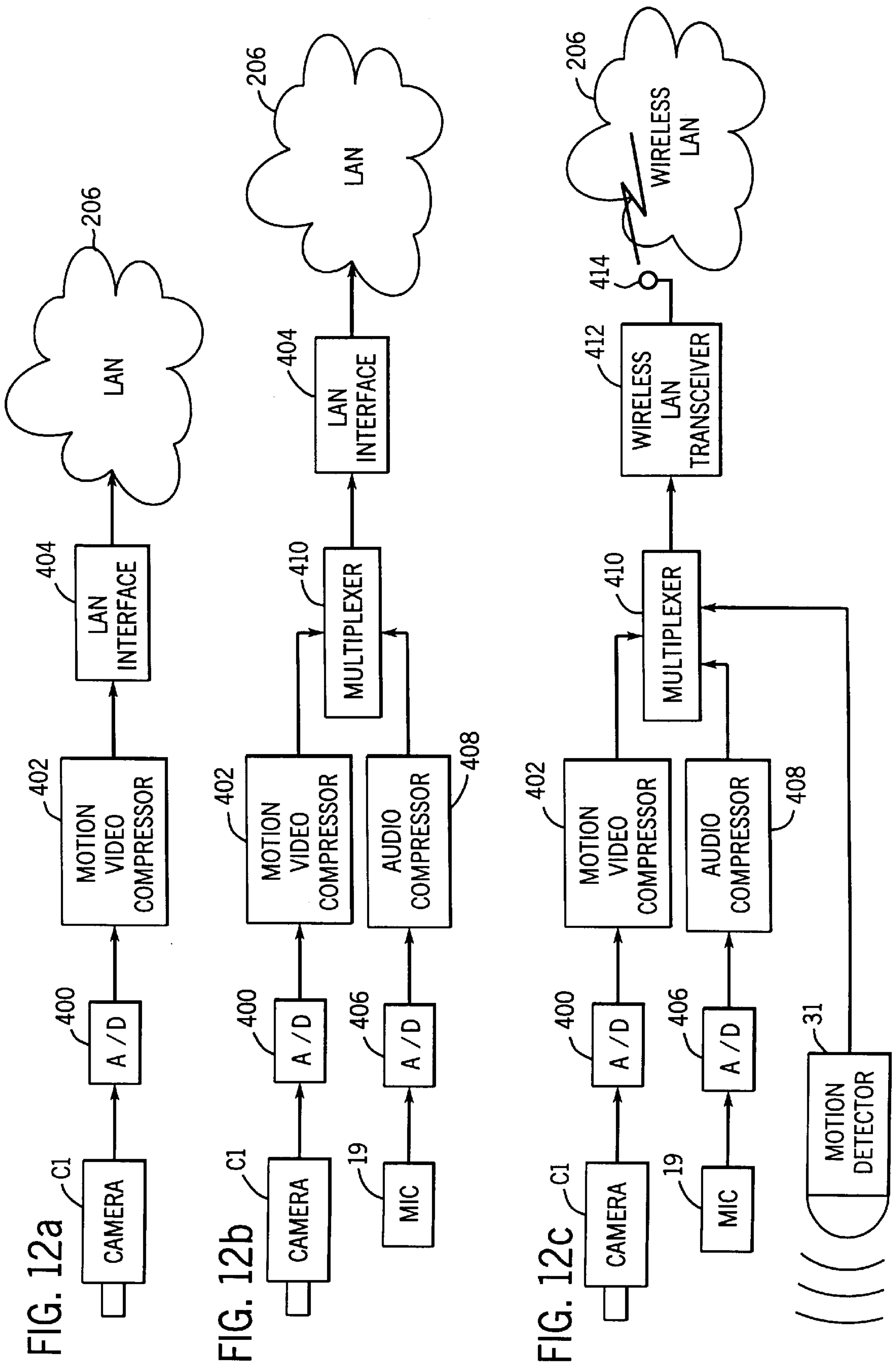
FIGS. 12*a*, 12*b* and 12*c* are illustrations of various system configurations for LAN and wireless local area network (W-LAN) systems.

FIGS. 12*a*, 12*b* and 12*c* show alternative embodiments permitting use of a wired or wireless LAN transmission system. As shown in FIG. 12*a*, with a camera sensor C1 for purposes of simplification, the camera C1 generates an analog signal which is converted to a digital signal at convertor 400 and then compressed at the motion video compressor 402. This can be accomplished by industry standard techniques such as motion-JPEG, MPEG, or motion wavelet compression or other current or future compression algorithms. The compressed digital signal is then packetized by the LAN interface 404 and transmitted to the LAN 206 in well-known manner. An analog audio sensor such as microphone 19 is added in FIG. 12*b* and is supported the dedicated convertor 406 and compressor 408 for input to the multiplexer 410 where the compressed digital audio signal is combined with the compressed digital video signal to produce a complex multi-media signal for packetization by the LAN 404 interface. As shown in FIG. 12*c*, digital sensors such as motion detector 31 may also be included. The motion detector digital signal does not require conversion and is input directly into the multiplexer 410. As also shown in FIG. 12*c*, the LAN may be wireless, with a wireless transceiver 412 being incorporated in the system. As previously described, any portion of the system may be wired or wireless depending on ease of installation, mobility requirements and other issues. It may be noted that functions such as the motion video compressor, audio compressor, multiplexer and LAN protocol functions may all be performed as software and could operate on one high speed computer such as a Digital Signal Processor (DSP).

Figure 13:
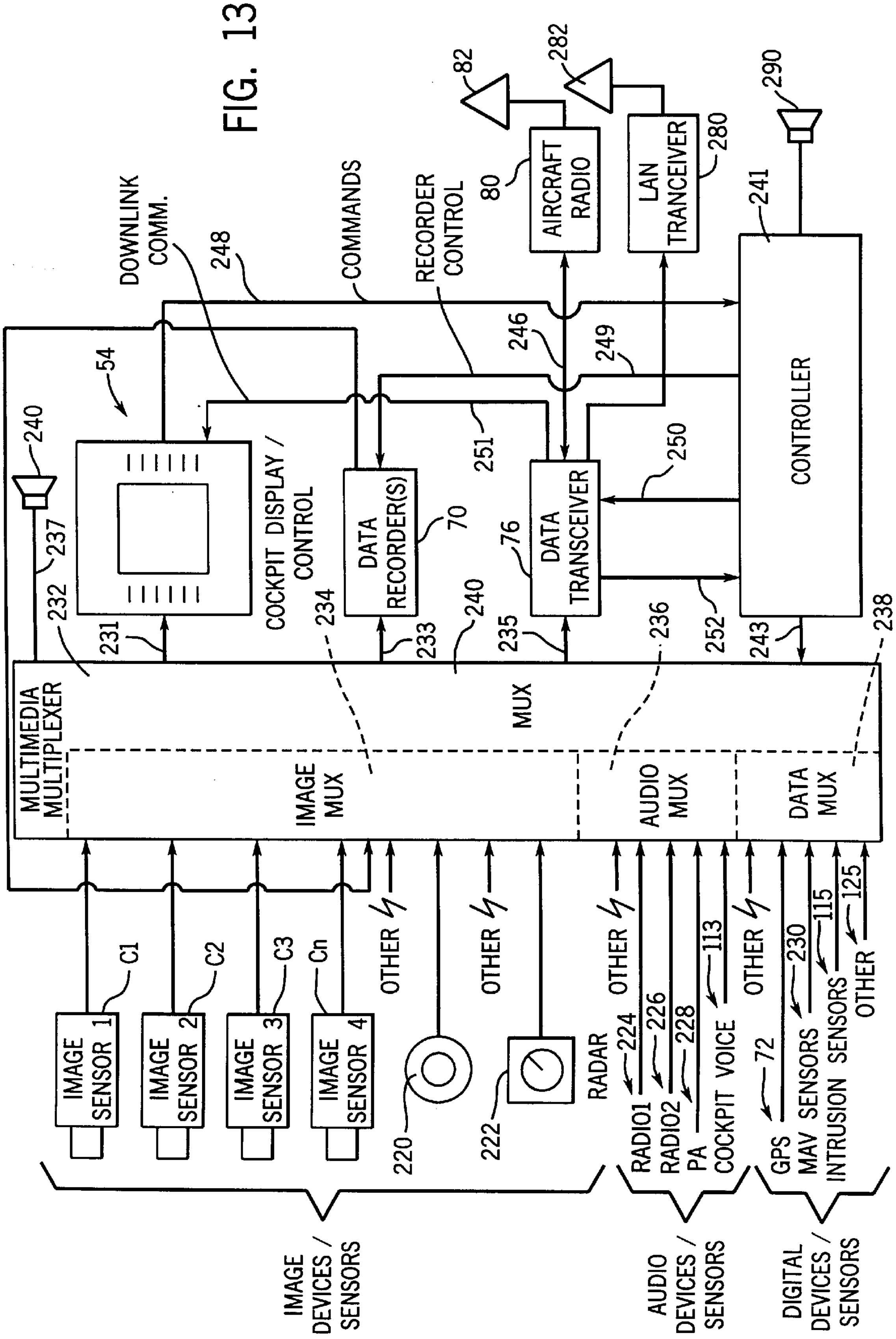
FIG. 13 is a detailed diagram of the onboard surveillance system for use in connection with transport two-way radio and/or the wireless LAN system of FIGS. 12*a*, 12*b* and/or 12*c*.

Turning now to FIG. 13, additional multi-media sensors may be incorporated in the system, as well, and may be wireless or hard wired as appropriate. For example, one or more audio sensors such as a cockpit voice sensor 113 transmit audio signals to multiplexer processor 232. Various function sensors, such as, by way of example, an entire array of intrusion security sensors 115 may also be incorporated in the multi-media system of the subject invention. Where a plurality of such sensors are utilized, it is desirable to provide a local multiplexer system 238 to minimize the amount of duplicative hardware. In the example shown, all of the intrusive security sensors in array 115 require only a single transmitter and antenna as part of a local multiplexer 238 which may then feed a combined signal to the multi-media multiplexer 232. In a wireless system, the security sensor array may also be fully self-contained with an independent power supply.

As shown, a variety of image sensor devices may be incorporated, including the video cameras C1, C2, C3 . . . Cn, an advanced imaging device such as the FLIR camera 220, the on board radar 222 and the like. All of these produce a visual signal. In addition, various audio signals may be incorporated utilizing a variety of audio sensor devices, such as a cockpit voice sensor 113, on board radios 224, 226 and the aircraft public address system 228. All of these produce an audio signal. The operational data signals are also incorporated, as previously described, and may include the GPS sensor 72, other navigational sensors 230, the various intrusion sensors 115 and other sensors 125. Thus, the system of the subject invention will accommodate a multiple input, multi-media array incorporating video, audio and digital data signals into a comprehensive database for providing detailed information relating to the aircraft condition at any time.

Each sensor device signal is introduced into a multi-media multiplexer network 232 which includes a image multiplexer subsystem 234, a dedicated audio multiplexer subsystem 236 and a digital data multiplexer subsystem 238, all of which produce distinctive multiplexed signals which are introduced into a master multiplexer subsystem 232 for producing a combined, comprehensive output signal, as selected, on each of lines 231, 233 and 235. It may also perform decompression functions for compressed command streams and compressed audio or video. The setup and control of the comprehensive output signal is provided by a master controller 241 and input to the multiplexer 232 at 243. The system controller receives commands and streaming audio information from other system elements and distributes them to controlled devices. The controller performs a command decoding function to sort out command and data streams directed toward specific devices and components of the system.

The visual and textual data is available at a display monitor 54. The audio signal is output at 237 to an audio output system such as amplified speaker 240. All of the data, including all video, audio and digital data will be recorded on the recorder system 70. Information representing audio, video, sensor data, and other vital digital data is fed from the multimedia multiplexer to the recorder 70 over the signal lines 233. It should be noted that the multimedia multiplexer may be analog, digital, or packetized digital data type, or a combination of technologies based on application. Where desired, selected portions of the systems data on the aircraft may be downlinked to the ground or base station 18 (see FIG. 2) as the combined, comprehensive output signal on line 246 to be transmitted to the ground station via the aircraft radio system 80 and the antenna 82. As previously described, the information may also be transmitted to a wireless satellite via transceiver 280 and dedicated antenna 282. Once the information is generated as a useable data signal, as indicated at line 231, 233 and 235, the controller, in combination with commands from ground security, controls the collection, monitoring and review of the information. This permits access to any single sensor signal, or any combination via line 231 by sending a command via line 248 to the controller 241 for controlling the monitor related multiplexing switches via line 243 to control the signal output on line 231. For example, this may be a single camera view or an array of intrusive motion sensors 115.

Where desired, a light level detector may be is used for detecting light conditions such as the ambient lighting or transient conditions such as vehicle headlights or a flashlight. The light detector analog/digital convertor adapts the ambient light levels into a digital data stream. this digitizer runs at rear-time rates for teal-time illumination monitoring. The light detector signal processor can be programmed to look for profiles such as rapidly increasing light conditions that may indicate a vehicle or a flashlight as opposed to the rising or setting sun. Detection of such and event would trigger a specified unique alarm condition to be transmitted back to other elements of the system.

External contact sensors may also be deployed and a condition change may be detected and processed by the contact signal processor. These may be devices such as door contacts, special motion detectors such as trip wires and the like, floor pads and the like which can be connected, either by wires or wireless means to the contact detection circuit. Detection of such an event would trigger a specified alarm condition to be transmitted back to other elements of the system.

An audible speaker system can also be provided in the preferred embodiment and can provide numerous audio outputs such as, by way of example, voice output or a siren. This is a multi-function device and can be activated by local detection events, and by other system elements such as detection by a companion sensor unit signaling over the wireless system. The siren can indicate an area of concern, serve as a signal to security personnel and/or scare of intruders. The audible speaker can also be used to provide voice instructions or signals base on local detection events, and by other system elements. The controller produces the synthesized or stored voice signals. The controller can programmed or downloaded over the wireless system. The speaker system can also be use as a paging system by sending digitized or compressed voice signals over the wireless system to one or more multi-media devices. In addition, the audio speaker can be use conjunction with the audio detector 408 to communicate with the area.

Power is provided in the well-known manner. In the preferred embodiment, system power is used to power up the system through a convertor and a rechargeable battery system comprising a charger/controller and rechargeable battery supply.

In certain applications it may be desirable to combine many of the functions described herein, such as the signal processing, data multiplexing 232, LAN or WAN network transceiver 330, control and parts of the network interface, perhaps utilizing software running at high speed in a high speed DSP engine. This would serve to reduce hardware complexity, improve reliability, reduce power consumption, and reduce cost. The network interface provides a wired interface to the system for connecting other system elements in a hardwired configuration. This can be any one of several well known but evolving technologies such as 10Base-T, the better 100 Base-T or high-speed Gigabit LAN or WAN technology. Such a configuration does not depart from the scope and spirit of the subject invention.

Figure 14:
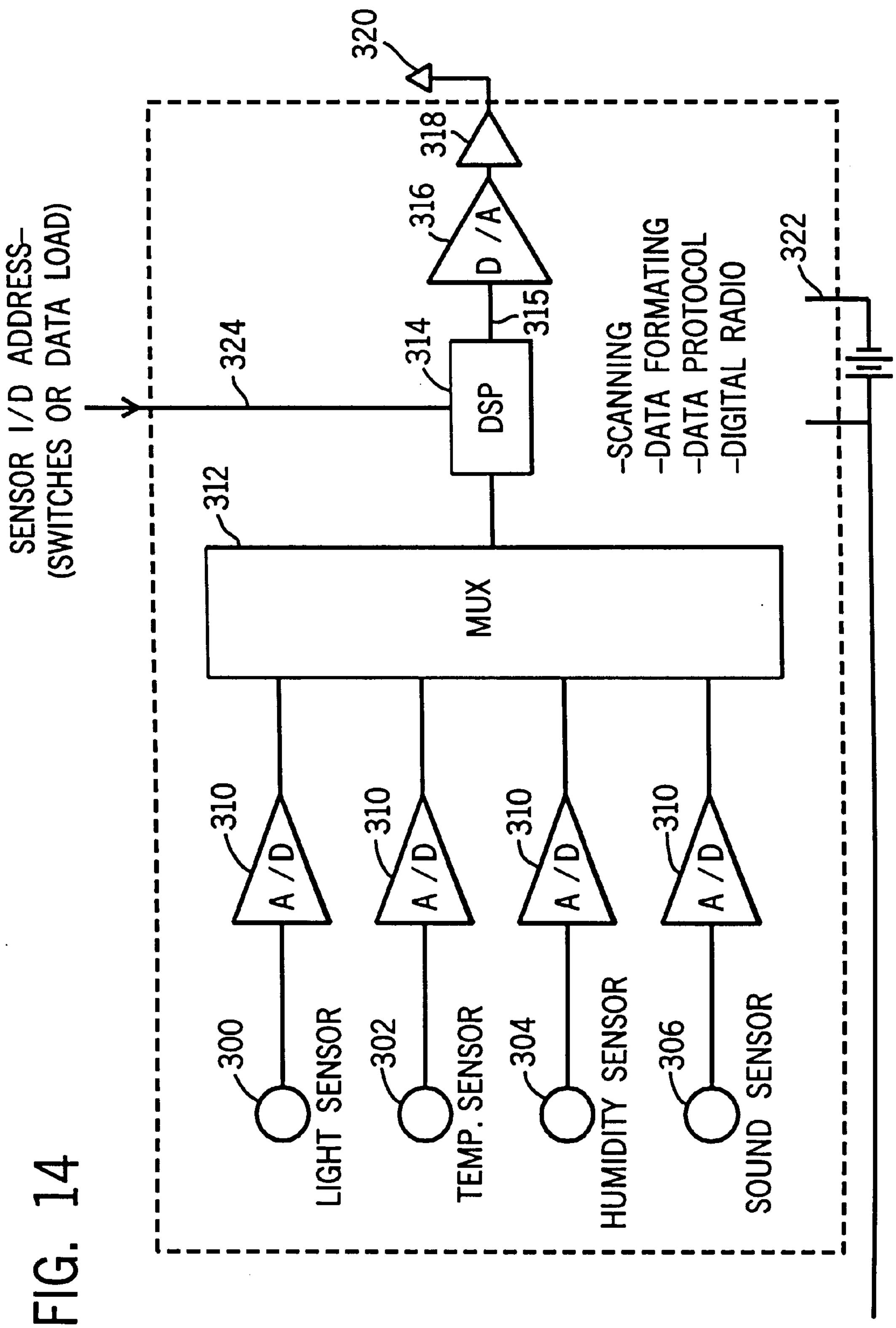
FIG. 14 is an integrated sensor/wireless LAN subsystem using DSP technology.

FIG. 14 is a diagrammatic illustration of an integrated sensor/wireless LAN subsystem using DSP technology. As there shown, the various analog sensors such the light sensor 300, the temperature sensor 302, the humidity sensor 304, and the sound or audio sensor 306 (as well as other sensors as previously described herein and as desired for application) produce analog signals which are converted at one of the dedicated analog-to-digital convertors 310 and then introduced into a multiplexer 312. The multiplexer 312 produces a combined digital output signal which is introduced into the DSP processor 314, which produces the system output on line 315, where it is again converted at convertor 316, amplified at amplifier 318 and transmitted via antenna 320. In the preferred embodiment, an integral power supply 322 is provided. The Sensor I/D address is on line 324. This system provides a highly integrated sensor/processor/transceiver and typically can be housed on a single chip using available configuration technology.

Figure 15:
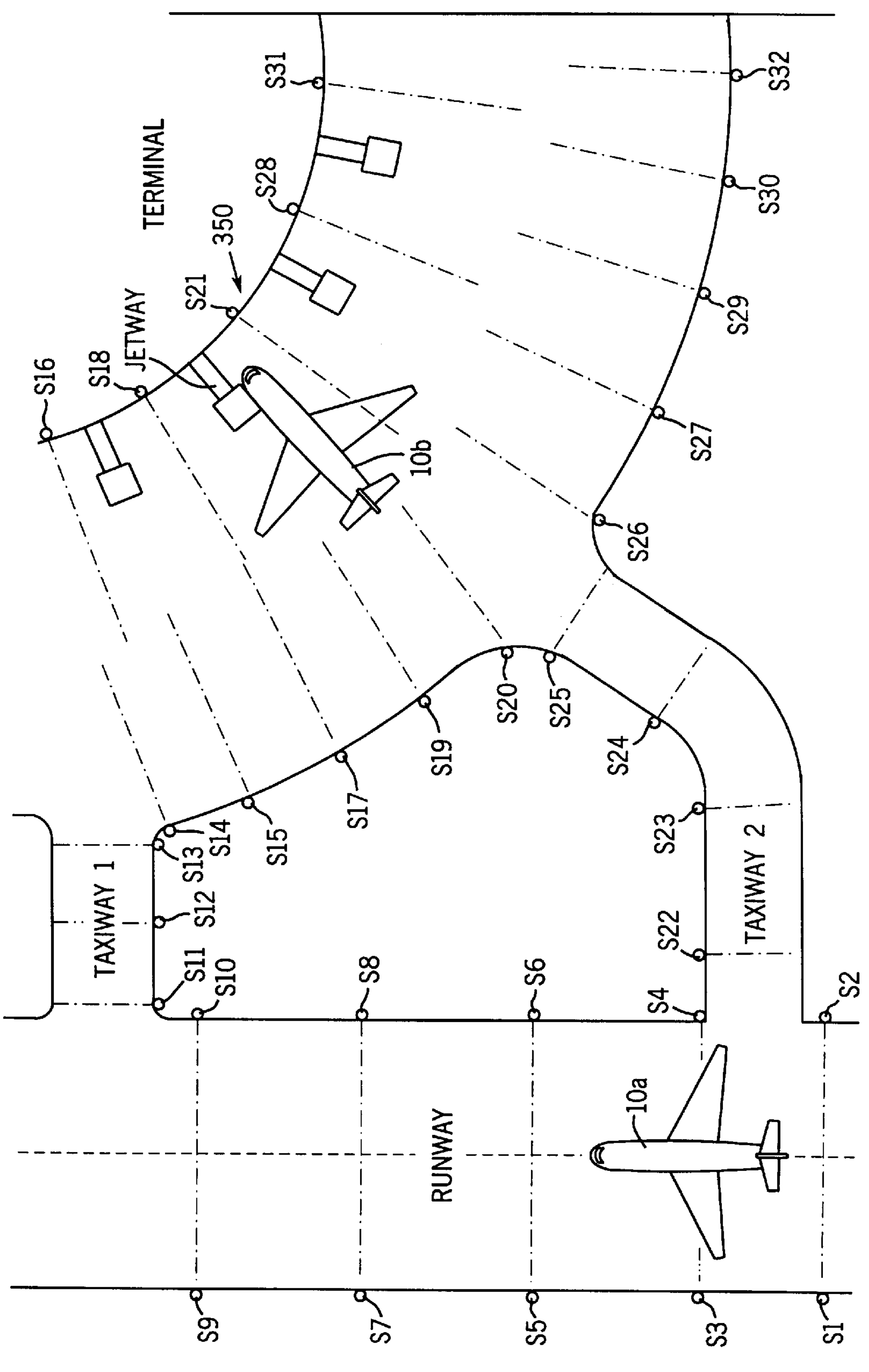
FIG. 15 is a diagrammatic illustration of the positioning of tracking sensors on the ramp, particularly well-suited for tracking assets without internal positional or tracking sensors.

FIG. 15 is a diagrammatic illustration of the placement of tracking sensors on the ramp and taxiways of an airport for tracking the movement of the commercial transports such as transports 10*a* and 10*b* as they come into the gate area 350. The sensors S1–S32, are strategically place to track the transport as it proceeds along the runway, the taxiway and the ramp. This is particularly useful for aircraft which do not have GPS signal generating sensors, making it possible to track and identify the transport at any time. Various sensing devices can be utilized in this configuration such as acoustic sensors, acoustic return "sonar", optical, optical return, microwave, microwave return, contact or weight detection, electronic proximity (underground wire), or similar sensors. The sensor system detects the transport, and where return sensors are used, will also identify the distance. By using sequential sensors, the speed and direction of travel may also be calculated. This type of sensor system will also detect the presence of other assets or personnel in the area.

Figure 16:
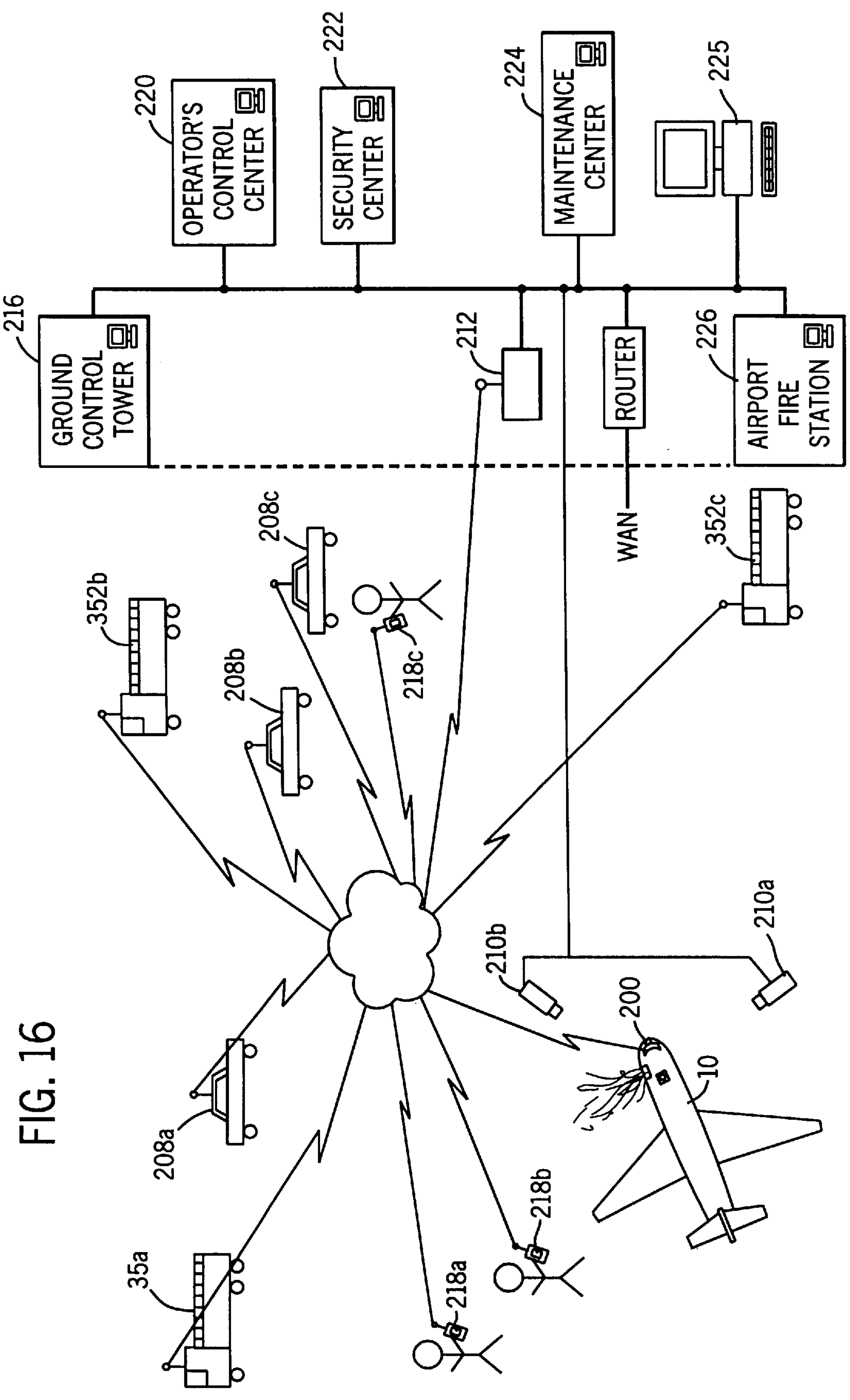
FIG. 16 is a diagrammatic illustration of the selection process techniques for identifying and alerting personnel upon the occurrence and detection of an event requiring response.

FIG. 16 is an expanded illustration demonstrating the calculation and signaling of appropriate personnel and equipment to the site of an event requiring emergency response. By way of example, assume the tracking camera 210*a* and 210*b* provided a visual signal indicating smoke at transport 10. At the same time, the on-board fire and smoke detectors would transmit a signal to the ground based transceiver 212 via the wireless LAN. In addition, the precise location of the transport will be known because of the location signal generated by the transport GPS sensor 200 which is also transmitted over the LAN. The receipt of these various signal will activate several actions. First, all of this information will be transmitted to the ground control tower 216 and to the operations control center 220, as has been previously described herein. The airport fire station 226 will be alerted to the indication of a fire and smoke event and the security center 222 and maintenance center 224 will receive appropriate information. The automated dispatch computer center 225 will monitor the location signal provided by the transport, as well as the location signal of on ground personnel 218*a*–218*c*, response vehicles 208*a*–208*c* and fire support vehicles 352*a*–*c*. By monitoring the type of event that has occurred and both the type and location of available personnel and equipment, the dispatch center can alert and initiate the most efficient appropriate response. The location signals provide sufficient information for the computer system 225 to determine by well-known methods, which asset is closest. For example, ground personnel 218*b* is closest and would receive the first response signal. If a response vehicle was programmed to respond, vehicle 208*a* would be first alerted. Likewise, the closest fire truck is truck 352*c*, which would be the first alerted. As back-up is needed, each of the ground support assets have the capability of signaling for additional support directly back to the dispatch computer. The computer can then select the next closest appropriate asset. The system of the present invention provides a comprehensive, efficient method of collecting, distributing and reacting to critical information to maximize the response of appropriate functional vehicles and personnel on a real time basis while assuring that assignments are prioritized as set by operational personnel. This greatly increases both the timing and the effectiveness of response to critical events.

The multi-media security and surveillance system of the subject invention provides an enhanced security scheme giving instantaneous and live image access to critical components and areas of an aircraft or vehicle, providing the ground based security personnel with additional information while the aircraft or vehicle is not in use and is left unattended. In addition, the permanent tape record will prove invaluable for investigating unauthorized activity or accidents after they have occurred. The preferred embodiment of the system is specifically designed for new commercial aircraft but is equally well suited for retrofit applications and for other safety applications as well, and may be scaled up or scaled down depending on application.

The video recorders, synchronizing networks and multiplexing and split screen hardware are well known and their adaptation will be readily apparent to those of ordinary skill in the art. Any suitable video recording format can be used, for example, an analog video tape recorder, a digitizer and tape, hard drive or optical drive configuration. Digital cameras could be incorporated in lieu of the standard analog type cameras currently in use in most applications. As digital technology becomes more readily available and more cost effective, it is contemplated that most of the imaging, monitoring and-recording equipment will be of a digital format because of the increased reliability and the minimized space requirements. Of course, it should also be understood that the monitoring, transmitting and storage capabilities of the invention are also well suited for capturing any video or visual image generated by the on board avionics of the aircraft.

While certain features and embodiments of the invention have been described in detail herein, it will be readily understood that the invention encompasses all modifications and enhancements within the scope and spirit of the following claims.

What is claimed is:

1. A traffic management, security and surveillance system for ground or in port monitoring and tracking of a commercial transport and related assets, the system comprising:

a. a plurality of ground based sensors, each adapted for monitoring the presence of a commercial transport and/or an asset within the range of each of said sensors and for generating a unique and identifiable data signal representing the specific type of transport and/or asset and the location thereof;

b. a ground based monitoring station having automatic processing capability adapted for generating decisions based on commercial transport and asset location data; and c. a communication system for transmitting all of the unique location data signals from the ground based sensors to the ground based monitoring station for monitoring the location of the assets and the commercial transport.

2. The system of claim 1, further including at least one commercial transport based sensor adapted for identifying the commercial transport and for transmitting a transport identification signal to the ground based monitoring station.

3. The system of claim 2, further including a commercial based location sensor adapted for monitoring the location of the commercial transport and generating a transport location signal in response thereto and transmitting the transport location signal to the ground based monitoring station.

4. The system of claim 1, wherein each asset includes an asset based sensor adapted for identifying the asset and for transmitting an asset identification signal to the ground based monitoring station.

5. The system of claim 4, further including an asset based location sensor adapted for monitoring the location of the asset and generating an asset location signal in response thereto and transmitting the asset location signal to the ground based monitoring station.

6. The system of claim 1, further including means for transmitting location data for all assets and transports from the ground based monitoring station to the commercial transport.

7. The system of claim 1, further including means for transmitting location data for all assets and transports from the ground based monitoring station to each of the assets.

8. The system of claim 1, wherein the ground based monitoring station further includes a map generator for generating a map defining the presence and location of all transports and assets within the system.

9. The system of claim 3, wherein said location sensor is an on-board GPS signal generator.

10. The system of claim 5, wherein said location sensor is an on-board GPS signal generator.

11. The system of claim 1, wherein each ground based sensor further includes an integral power supply.

12. The system of claim 11, wherein each ground based sensor includes a wireless transmitter for transmitting the signal generated thereby to the ground based monitoring station.

13. The system of claim 12, further including a wireless transmission network for transmitting signals between the sensors and between the sensors and the ground based monitoring station.

14. The system of claim 1, wherein at least one of the ground based sensors is hardwired to the ground based monitoring station.

15. The system of claim 13, wherein there is further including a wireless transmission module associated with a plurality of ground based sensors and wherein said plurality of ground based sensors are hardwired to the wireless transmission module.

16. The system of claim 1, wherein the communication system further comprises:

a. a transmitter associated with the sensor; and b. a receiver associated with the monitoring station for wireless transmission of the data signals to the ground based monitoring station.

17. The system of claim 1, wherein the communication system further comprises a wireless network for transmitting the data signals to/from the sensor and the ground based monitoring station.

18. The system of claim 1, further including:

a. a collector adapted for collecting the plurality of data signals from the plurality of sensors and generating therefrom a combined signal incorporating each of the plurality of signals into a combined output signal; and b. a processing system for receiving and processing the combined output signal.

19. The system of claim 18, said collector and said processing system further including a self-contained power supply.

20. The system of claim 9, wherein said GPS sensor includes two component sensors, with on component sensor mounted at each end of the transport, whereby size and heading of the transport may be detected and monitored.

21. The system of claim 1, further including an archiving system for storing the data received by the ground based monitoring station.

22. The system of claim 21, wherein said archiving system is a recorder.

23. The system of claim 1, wherein each sensor further includes a transmitter adapted for wireless transmission of the data signal to a remote location, and wherein said aground based monitoring station includes a receiver, whereby the sensor signal may be transmitted to the ground based monitoring station.

24. The system of claim 23, wherein said wireless transmission system is a radio frequency transmitter/receiver.

25. The system of claim 1, wherein said commercial transport includes a unique identifier which is adapted to be sensed by the ground based sensor, whereby the ground based sensor can generate an identification signal for specifically identifying the commercial transport within the range of the ground based sensor.

26. The system of claim 1, further including an alarm generator for generating an alarm whenever an asset or a transport is in an unauthorized zone.

27. The system of claim 1, further including an alarm generator for generating an alarm whenever an unauthorized asset is in a zone.

28. The system of claim 26, wherein said alarm is transmitted directly to the commercial transport.

29. The system of claim 1, further including a portable personnel based unit including a location signal generator for identifying the location of the personnel and a communication system capable of transmitting and receiving information to/from the ground based monitoring station.

* * * * *